(12) United States Patent
Zimmerman et al.

(10) Patent No.: US 6,869,206 B2
(45) Date of Patent: Mar. 22, 2005

(54) ILLUMINATION SYSTEMS UTILIZING HIGHLY REFLECTIVE LIGHT EMITTING DIODES AND LIGHT RECYCLING TO ENHANCE BRIGHTNESS

(76) Inventors: Scott Moore Zimmerman, 230 Woods End Dr., Basking Ridge, NJ (US) 07920; Karl Wayne Beeson, 269 Christopher Dr., Princeton, NJ (US) 08540

(*) Notice: Subject to any disclaimer, the term of this patent is extended or adjusted under 35 U.S.C. 154(b) by 31 days.

(21) Appl. No.: 10/445,136

(22) Filed: May 23, 2003

(65) Prior Publication Data

US 2004/0233655 A1 Nov. 25, 2004

(51) Int. Cl.$^7$ ................................. F21V 9/14
(52) U.S. Cl. .................... 362/310; 362/19; 362/243; 362/329; 362/800
(58) Field of Search ............... 362/19, 242, 243, 362/245, 800, 240, 247, 310, 297, 298, 304, 300, 301, 307, 555, 545, 544, 329, 231, 11, 257, 296, 342, 516, 299, 308, 328

(56) References Cited

U.S. PATENT DOCUMENTS

| | | | | |
|---|---|---|---|---|
| 1,734,834 A | * | 11/1929 | Steward et al. | 362/300 |
| 2,206,521 A | * | 7/1940 | Van Den Akker et al. | 362/308 |
| 3,676,667 A | * | 7/1972 | Malifaud | 362/301 |
| 4,460,939 A | * | 7/1984 | Murakami et al. | 362/300 |
| 6,144,536 A | * | 11/2000 | Zimmerman et al. | 361/31 |
| 6,488,389 B2 | * | 12/2002 | Cassarly et al. | 362/247 |

* cited by examiner

Primary Examiner—Thomas M. Sember
Assistant Examiner—Bao Q Truong
(74) Attorney, Agent, or Firm—William Propp, Esq.

(57) ABSTRACT

An illumination system that has an output luminance (brightness) $L_O$ that is greater than the intrinsic output luminance (brightness) $L_I$ of the light emitting diodes used within the system. The system utilizes one or more light emitting diodes having highly reflective surfaces and recycles a portion of the light generated by the light emitting diodes back to the light emitting diodes in order to enhance the effective luminance. The illumination system includes a light-reflecting cavity and one or more highly reflective light emitting diodes having total surface area $A_S$ mounted inside the cavity, either on the interior surfaces of the cavity or within the cavity volume. The cavity has a light output aperture of area $A_O$. The light emitting diodes have reflectivity $R_S$. The exposed inside surfaces of the light-reflecting cavity have reflectivity $R_C$. In order to achieve enhanced brightness, it is required that the area of the light output aperture $A_O$ be less than the total area $A_S$ of the light emitting diodes. It is preferred that reflectivity $R_C$ and reflectivity $R_S$ each be at least 50%, more preferably 75% and most preferably 90%. Illumination systems with enhanced luminance resulting from light recycling may be used in projection displays, flat-panel displays, avionics displays, automotive lighting, residential lighting, commercial lighting and industrial lighting applications.

46 Claims, 15 Drawing Sheets

ILLUMINATION SYSTEMS UTILIZING HIGHLY REFLECTIVE LIGHT EMITTING DIODES AND LIGHT RECYCLING TO ENHANCE BRIGHTNESS

TECHNICAL FIELD

This invention relates to illumination systems and optical systems incorporating illumination systems, including projection displays, flat-panel displays, avionics displays, automotive lighting, residential lighting, commercial lighting, industrial lighting and the like.

BACKGROUND OF THE INVENTION

Illumination systems are used as either stand-alone light sources or as internal light sources for more complex optical systems. Examples of optical systems that utilize or incorporate illumination systems include projection displays, flat-panel displays, avionics displays, automotive lighting, residential lighting, commercial lighting and industrial lighting applications.

Many applications require illumination systems with high luminance (brightness) and a small effective emitting area. The term "luminance" or brightness is defined as lumens per unit area per unit solid angle. An example of a conventional light source with high luminance and a small effective emitting area is an arc lamp source, such as a xenon arc lamp or a mercury arc lamp. Arc lamp sources may have emitting areas as small as a few square millimeters. An example of a complex optical system that can utilize an illumination system with high luminance and a small effective source area is a projection television display. Current projection television displays typically project the combined images of three small red, green and blue cathode-ray-tube (CRT) devices onto a viewing screen using a projection lens. More recent designs sometimes use a small-area arc lamp source to project images from a liquid crystal display (LCD), a liquid-crystal-on-silicon (LCOS) device or a digital light processor (DLP) device onto a viewing screen. Light emitting diode (LED) sources are currently not used for projection television displays because LED sources do not have sufficient output luminance.

In a conventional optical system that transports light from an input source at one location to an output image at a second location, one cannot produce an optical output image that has a luminance higher than the luminance of the light source. A conventional optical system 10 of the prior art is illustrated in FIG. 1A. In FIG. 1A, light rays 18 from an input light source 12 are focused to an output image 16 using a convex lens 14. The conventional optical system 10 in FIG. 1A can also be illustrated in a different manner as optical system 20 in FIG. 1B. In FIG. 1B, the input source 22 has area, $Area_{in}$. The light from input source 22 fills a cone 23 covering a solid angle 27, which is shown in cross-section in FIG. 1B. The magnitude of solid angle 27 is $\Omega_{in}$. Lens 24 focuses the light to image 26 having area, $Area_{out}$. The light forming the image 26 fills a cone 25 covering a solid angle 28, which is shown in cross-section. The magnitude of solid angle 28 is $\Omega_{out}$. If the optical system has no losses, the light input flux at the input source 22, $\phi_{in}=(L_{in})(Area_{in})(\Omega_{in})$, equals the light output flux at the output image 26, $\phi_{out}=(L_{out})(Area_{out})(\Omega_{out})$. In these equations, $L_{in}$ is the luminance of the input source 22, $L_{out}$ is the luminance of the output image 26, "$Area_{in}$" is the area of the input source 22 and "$Area_{out}$" is the area of the output image 26. The quantities $\Omega_{in}$ and $\Omega_{out}$ are, respectively, the solid angles subtended by the input source and output image light cones. In such a lossless system, it can be shown that $L_{in}=L_{out}$ and $(Area_{in})(\Omega_{in})=(Area_{out})(\Omega_{out})$. If the index of refraction of the optical transmission medium is different at the input source and output image positions, the equality $(Area_{in})(\Omega_{in})=(Area_{out})(\Omega_{out})$ is modified to become $(n_{in}^2)(Area_{in})(\Omega_{in})=(n_{out}^2)(Area_{out})(\Omega_{out})$, where $n_{in}$ is the index of refraction at the input position and $n_{out}$ is the index of refraction at the output position. The quantity $(n^2)(Area)(\Omega)$ is variously called the "etendue" or "optical extent" or "throughput" of the optical system. In a conventional lossless optical system, the quantity $(n^2)(Area)(\Omega)$ is conserved.

In U.S. Pat. No. 6,144,536, Zimmerman et al demonstrated that for the special case of a source that has a reflecting emitting surface, an optical system can be designed that recycles a portion of the light emitted by the source back to the source and transmits the remainder of the light to an output position. Under certain conditions utilizing such light recycling, the effective luminance of the source as well as the output luminance of the optical system can be higher than the intrinsic luminance of the source in the absence of recycling, a result that is not predicted by the standard etendue equations. An example of a light source with a reflecting emitting surface is a fluorescent lamp. In FIG. 2A is shown a cross-section 30 of a fluorescent lamp. The lamp has a glass envelope 32 enclosing a hollow interior 36. The hollow interior 36 is filled with a gas that can emit ultraviolet light when a high voltage is applied. The ultraviolet light excites a phosphor coating 34 on the inside surface of the glass envelope, causing the phosphor to emit visible light. The phosphor coating 34 is a partially reflecting surface in addition to being a light emitter. Therefore, it is possible to design an optical system that recycles a portion of the light generated by the phosphor coating 34 back to the coating 34 and thereby cause an increase in the effective brightness of the fluorescent lamp.

The disclosures on light recycling in U.S. Pat. No. 6,144,536 relate to linear light sources that have long narrow emitting apertures with aperture areas greater than 100 mm². Such configurations, which typically use fluorescent lamps as light sources, are not suitable for many applications such as illumination systems for large projection displays. At the time of the application for U.S. Pat. No. 6,144,536, a typical LED had an output of only 1 lumen per square millimeter and a light reflectivity of less than 20%. To make an illumination system for a projection television that needs 1000 lumens would require at least 1000 LEDs having a total surface area of 1000 mm². If 1000 such low-reflectivity, low-output LEDs were placed in a brightness-enhancing optical cavity having an output aperture with an area of 10 mm², the overall output efficiency would be much less than 1%. In other words, less than 10 lumens from the original 1000 lumens would exit the cavity. Such an illumination system would be neither useful nor practical.

Recently, highly reflective green and blue LEDs based on gallium nitride (GaN) semiconductor materials have been developed. Some of these devices have high light output, high luminance and have a light reflecting surface that can reflect at least 50% of the light incident upon the device. Luminance outputs up to several megacandelas per meter squared and total outputs exceeding a hundred lumens from a single packaged device are possible. Light outputs per unit area can exceed 30 lumens/mm². As such, several new applications relating to illumination systems have become possible. Advantages such as spectral purity, reduced heat, and switching speed all provide motivation to further the use of LEDs, replacing fluorescent, incandescent and arc lamp sources. FIG. 2B shows a recently developed type of LED 40 that has an emitting volume 46 located below both a transparent top electrode 43 and a second transparent layer 44. Light rays 45 are emitted by emitting volume 46 when an electric current is passed through the device 40. Below the emitting volume 46 is a reflective layer 47 that also serves as a portion of the bottom electrode. Electrical contacts 41 and 42 provide a pathway for electrical current to flow through the device 40. It is a recent new concept to have both electrical contacts 41 and 42 on the backside of the LED opposite the emitting surface. Typical prior LED designs placed one electrode on top of the device, which interfered with the light output from the top surface and resulted in devices with low reflectivity. The reflecting layer 47 allows the LED to be both an emitter and a reflector. Lumileds Lighting LLC, for example, produces highly reflective green and blue LED devices of this type. It is expected that highly reflective red LEDs with high outputs and luminance with also eventually be developed. However, even the new green and blue gallium nitride LEDs do not have sufficient luminance for many applications such as large projection television displays.

It would be highly desirable to develop LED-based illumination systems utilizing light recycling that have both a small effective emitting area and sufficient brightness for applications such as projection displays, flat-panel displays, avionics displays, automotive lighting, residential lighting, commercial lighting and industrial lighting applications.

SUMMARY OF THE INVENTION

One embodiment of the present invention is an optical illumination system comprising: (a) a light source for generating light, wherein the light source is at least one light emitting diode having a reflecting surface with reflectivity $R_S$ greater than or equal to 50 percent, wherein the maximum intrinsic luminance of the light source is $L_I$ and wherein the total light emitting area of the light source is area $A_S$; (b) a light-reflecting cavity enclosing the light source, wherein the inside surfaces of the light-reflecting cavity have reflectivity $R_C$ greater than or equal to 50 percent and wherein the inside surfaces of the light-reflecting cavity can reflect and recycle a portion of the light generated by the light source back to the light source; and (c) at least one light output aperture in the surface of the light-reflecting cavity, wherein the area of the light output aperture is area $A_O$ and wherein the area $A_O$ is less than the area $A_S$. Under some conditions, it is possible to achieve an output luminance $L_O$ from the light output aperture that is greater than $L_I$.

Another embodiment of the present invention is an optical illumination system comprising: (a) a light source for generating light, wherein the light source is at least one light emitting diode having a reflecting surface with reflectivity $R_S$ greater than or equal to 50 percent, wherein the maximum intrinsic luminance of the light source is $L_I$ and wherein the total light emitting area of the light source is area $A_S$; (b) a light-reflecting cavity enclosing the light source, wherein the inside surfaces of the light-reflecting cavity have reflectivity $R_C$ greater than or equal to 50 percent and wherein the inside surfaces of the light-reflecting cavity can reflect and recycle a portion of the light generated by the light source back to the light source; (c) at least one light output aperture in the surface of the light-reflecting cavity, wherein the area of the light output aperture is area $A_O$ and wherein the area $A_O$ is less than the area $A_S$; and (d) at least one partially reflecting optical element located in the light output optical path and located adjacent to the light output aperture of the light-reflecting cavity, wherein the partially reflecting optical element passes a first portion of the light transmitted by the light output aperture and reflects and recycles a second portion of the light transmitted by the light output aperture back into the light-reflecting cavity. Under some conditions, it is possible to achieve an output luminance $L_O$ from the light output aperture that is greater than $L_I$.

Another embodiment of the present invention is an optical illumination system comprising: (a) a light source for generating light, wherein the light source is at least one light emitting diode having a reflecting surface with reflectivity $R_S$ greater than or equal to 50 percent, wherein the maximum intrinsic luminance of the light source is $L_I$ and wherein the total light emitting area of the light source is area $A_S$; (b) a light-reflecting cavity enclosing the light source, wherein the inside surfaces of the light-reflecting cavity have reflectivity $R_C$ greater than or equal to 50 percent and wherein the inside surfaces of the light-reflecting cavity can reflect and recycle a portion of the light generated by the light source back to the light source; and (c) at least one light output aperture in the surface of the light-reflecting cavity, wherein the area of the light output aperture is area $A_O$ and wherein the area $A_O$ is less than the area $A_S$; and (d) at least one light collimating element located in the light output optical path and located adjacent to the light output aperture of the light-reflecting cavity, wherein the light collimating element partially collimates the light passing through the light output aperture. Under some conditions, it is possible to achieve an output luminance $L_O$ from the light output aperture that is greater than $L_I$.

Another embodiment of the present invention is an optical illumination system comprising: (a) a light source for generating light, wherein the light source is at least one light emitting diode having a reflecting surface with reflectivity $R_S$ greater than or equal to 50 percent, wherein the maximum intrinsic luminance of the light source is $L_I$ and wherein the total light emitting area of the light source is area $A_S$; (b) a light-reflecting cavity enclosing the light source, wherein the inside surfaces of the light-reflecting cavity have reflectivity $R_C$ greater than or equal to 50 percent and wherein the inside surfaces of the light-reflecting cavity can reflect and recycle a portion of the light generated by the light source back to the light source; and (c) at least one light output aperture in the surface of the light-reflecting cavity, wherein the area of the light output aperture is area $A_O$ and wherein the area $A_O$ is less than the area $A_S$; (d) at least one light collimating element located in the light output optical path and located adjacent to the light output aperture of the light-reflecting cavity, wherein the light collimating element partially collimates the light passing through the light output aperture; and (e) at least one partially reflecting optical element located in the light output optical path and located adjacent to the light collimating element, wherein the partially reflecting optical element passes a first portion of the light transmitted by the light output aperture and reflects and recycles a second portion of the light transmitted by the light output aperture back into the light-reflecting cavity. Under some conditions, it is possible to achieve an output luminance $L_O$ from the light output aperture that is greater than $L_I$.

Another embodiment of the present invention is a first optical illumination system comprising: (a) a light source for generating light, wherein the light source is at least one light emitting diode having a reflecting surface with reflectivity $R_S$ greater than or equal to 50 percent, wherein the maximum intrinsic luminance of the light source is $L_I$ and wherein the total light emitting area of the light source is area $A_S$; (b) a light-reflecting cavity enclosing the light source, wherein the inside surfaces of the light-reflecting cavity have reflectivity $R_C$ greater than or equal to 50 percent and wherein the inside surfaces of the light-reflecting cavity can reflect and recycle a portion of the light generated by the light source back to the light source; and (c) at least one light output aperture in the surface of the light-reflecting cavity, wherein the area of the light output aperture is area $A_O$ and wherein the area $A_O$ is less than the area $A_S$; (d) at least one light collimating element located in the light output optical path and located adjacent to the light output aperture of the light-reflecting cavity, wherein the light collimating element partially collimates the light passing through the light output aperture; and (e) at least one partially reflecting optical element located in the light output optical path and located adjacent to the light collimating element, wherein the partially reflecting optical element passes a first portion of the light transmitted by the light output aperture and reflects and recycles a second portion of the light transmitted by the light output aperture into a second optical illumination system. Under some conditions, it is possible to achieve an output luminance $L_O$ from the light output aperture that is greater than $L_I$.

BRIEF DESCRIPTION OF THE DRAWINGS

A more complete understanding of the present invention, as well as other objects and advantages thereof not enumerated herein, will become apparent upon consideration of the following detailed description and accompanying drawings, wherein.

DETAILED DESCRIPTION OF THE PREFERRED EMBODIMENTS

Figure 1A:
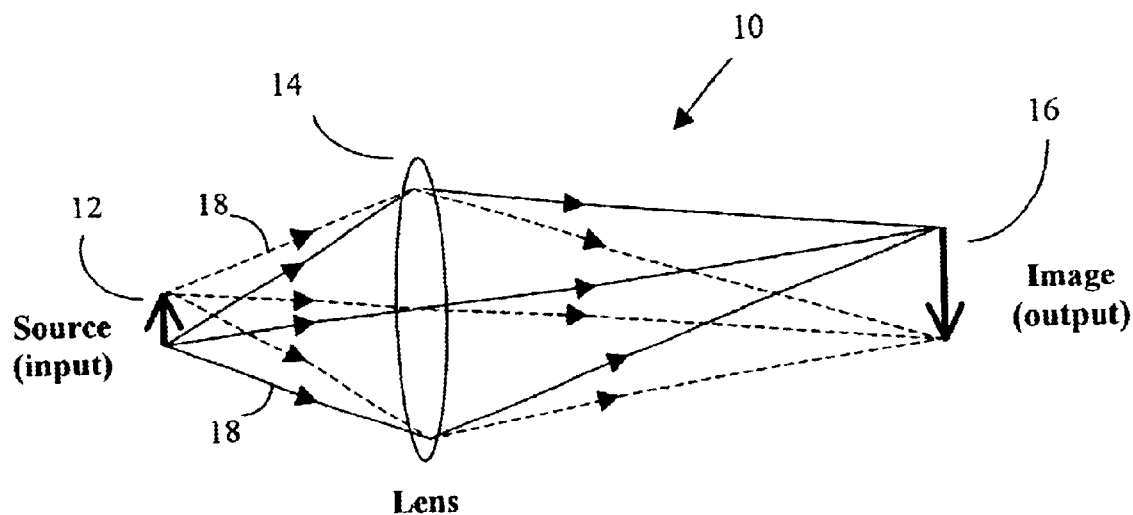
FIGS. 1A–1B are cross-sectional side views of conventional optical systems of the prior art.
Figure 1B:
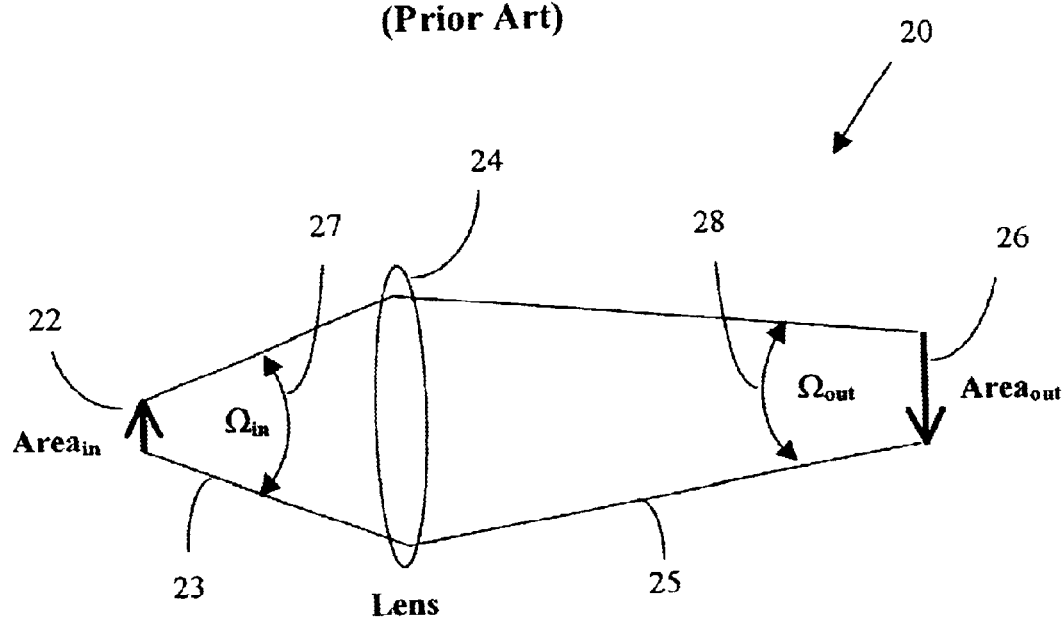
Figure 2A:
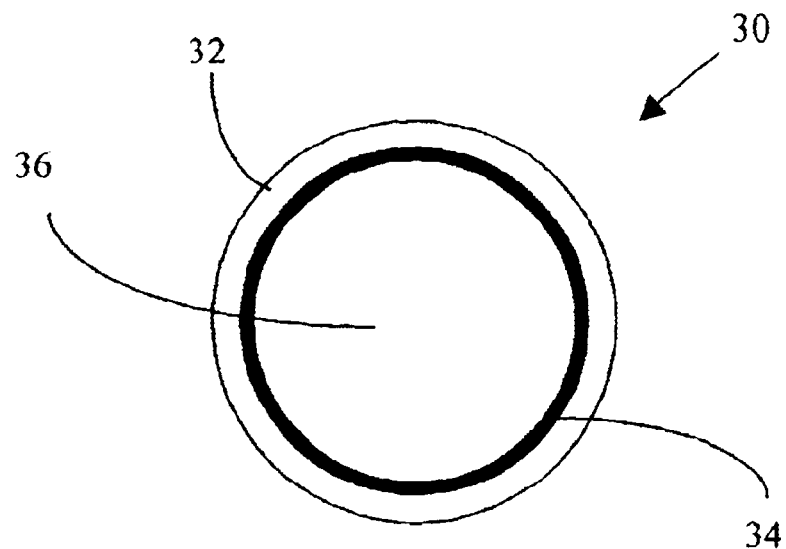
FIGS. 2A–2B are cross-sectional views of prior art light sources that have both reflecting and emitting surfaces.
Figure 2B:
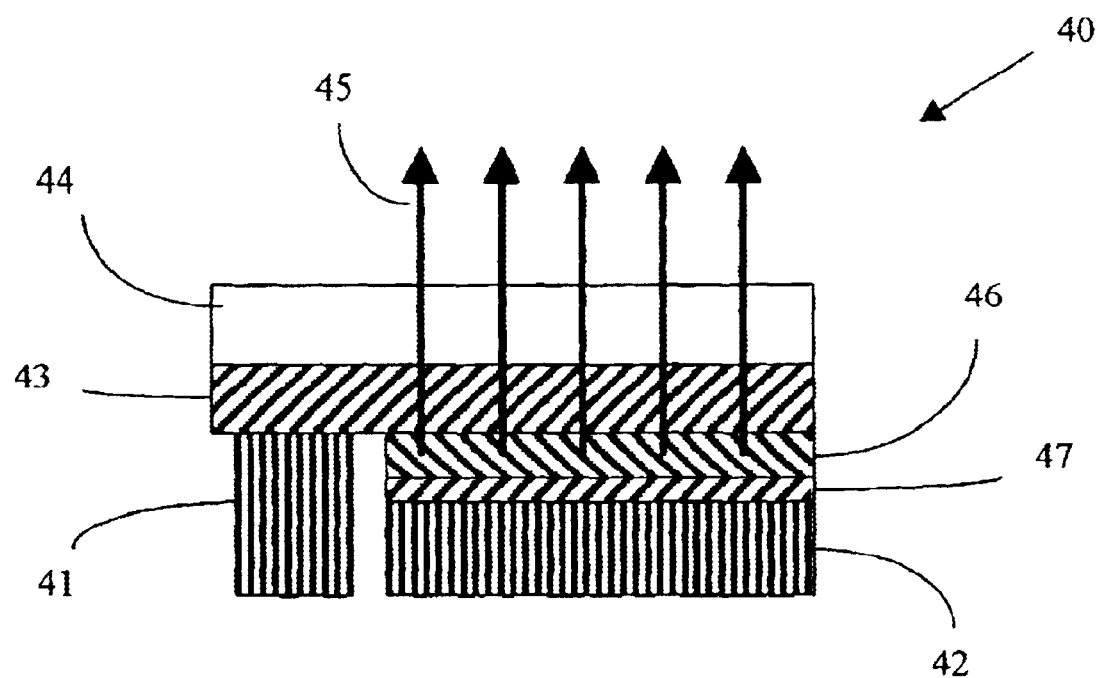

The preferred embodiments of the present invention will be better understood by those skilled in the art by reference to the above FIGURES. The preferred embodiments of this invention illustrated in the FIGURES are not intended to be exhaustive or to limit the invention to the precise form disclosed. The FIGURES are chosen to describe or to best explain the principles of the invention and its applicable and practical use to thereby enable others skilled in the art to best utilize the invention.

In FIGS. 3–15 are shown schematic diagrams of various embodiments of this invention. Light emitting diode 106 in FIGS. 3–15 may be any light emitting diode that both emits light and reflects light. Examples of light emitting diodes that both emit and reflect light include, but are not limited to, inorganic semiconductor based light emitting diodes (LEDs) and organic light emitting diodes (OLEDs). Inorganic semiconductor based LEDs can be fabricated from materials containing gallium nitride and gallium arsenide, but are not limited to such materials. Preferred light emitting diodes have a reflective surface that reflects at least 50% of the light incident upon the surface. For purposes of simplifying the figures, multiple light emitting diodes 106 in FIGS. 3–15 are illustrated in an identical manner and are shown as each being comprised of a light emitting volume 108 and a light-reflecting element 110. However, it is within the scope of this invention that multiple light emitting diodes 106 in an embodiment may not all be identical. For example, if an embodiment of this invention has a plurality of light emitting diodes 106, such as in FIGS. 6A–6B, it is within the scope of this invention that some of the light emitting diodes 106 may be inorganic semiconductor based LEDs and some of the light emitting diodes 106 may be OLEDs. As a further example of an illumination system having multiple light emitting diodes, if an embodiment of this invention has a plurality of light emitting diodes 106, such as in FIGS. 6A–6B, it is also within the scope of this invention that some of the light emitting diodes 106 may emit different colors of light. For example, some of the light emitting diodes 106 may be red LEDs, some of the light emitting diodes 106 may be green LEDs and some of the light emitting diodes 106 may be blue LEDs. In this example, the red, green and blue LEDs may be powered at the same time to produce a composite output color such as white light; or the red, green and blue LEDs may be powered at different times in a color-sequential fashion. In the latter case, for example, only the red LEDs are powered for a first time period, only the green LEDs are powered for a second time period and only the blue LEDs are powered for a third time period. Color-sequential illumination systems are important, for example, in some types of display applications. Preferably the reflectivity $R_S$ of the light emitting diode 106 is at least 50%. More preferably, the reflectivity $R_S$ of the light emitting diode 106 is at least 75%. Most preferably, the reflectivity $R_S$ of the light emitting diode 106 is at least 90%. The total area of all the light emitting diodes 106 within a single light-reflecting cavity is area $A_S$.

Figure 9:
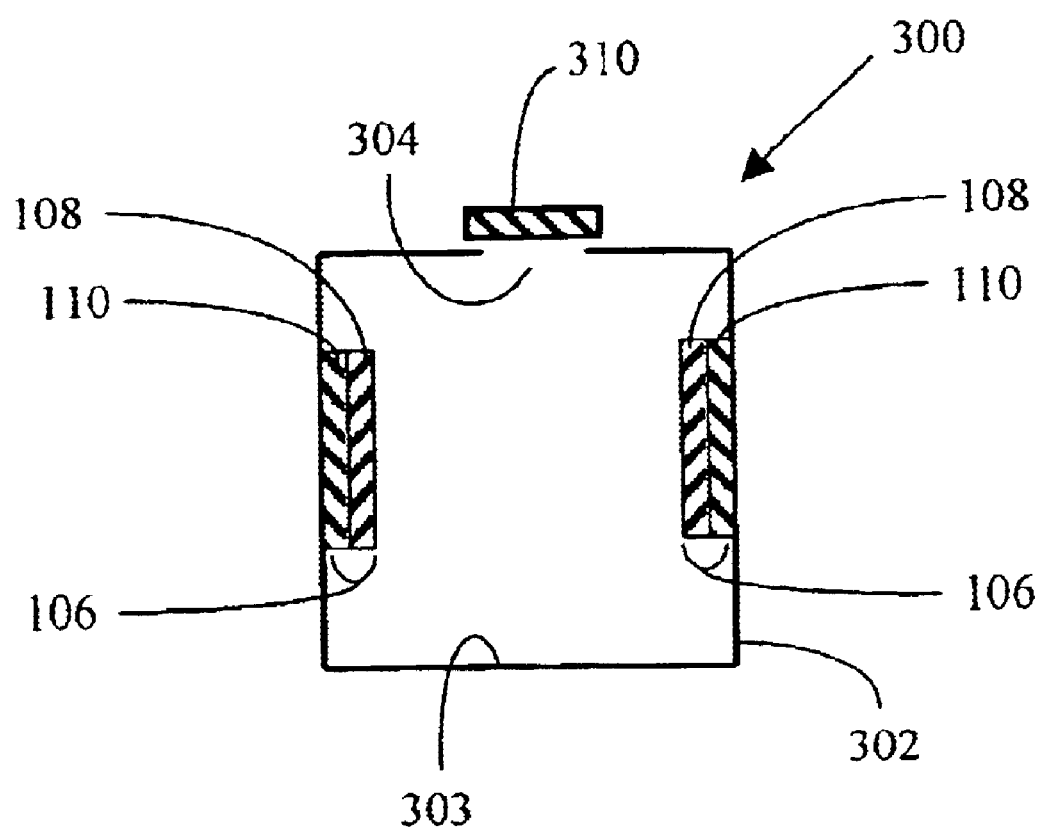
FIG. 9 is a cross-sectional side view of another embodiment of the present invention with two light emitting diodes and a partially reflecting optical element located adjacent to the light output aperture.
Figure 10:
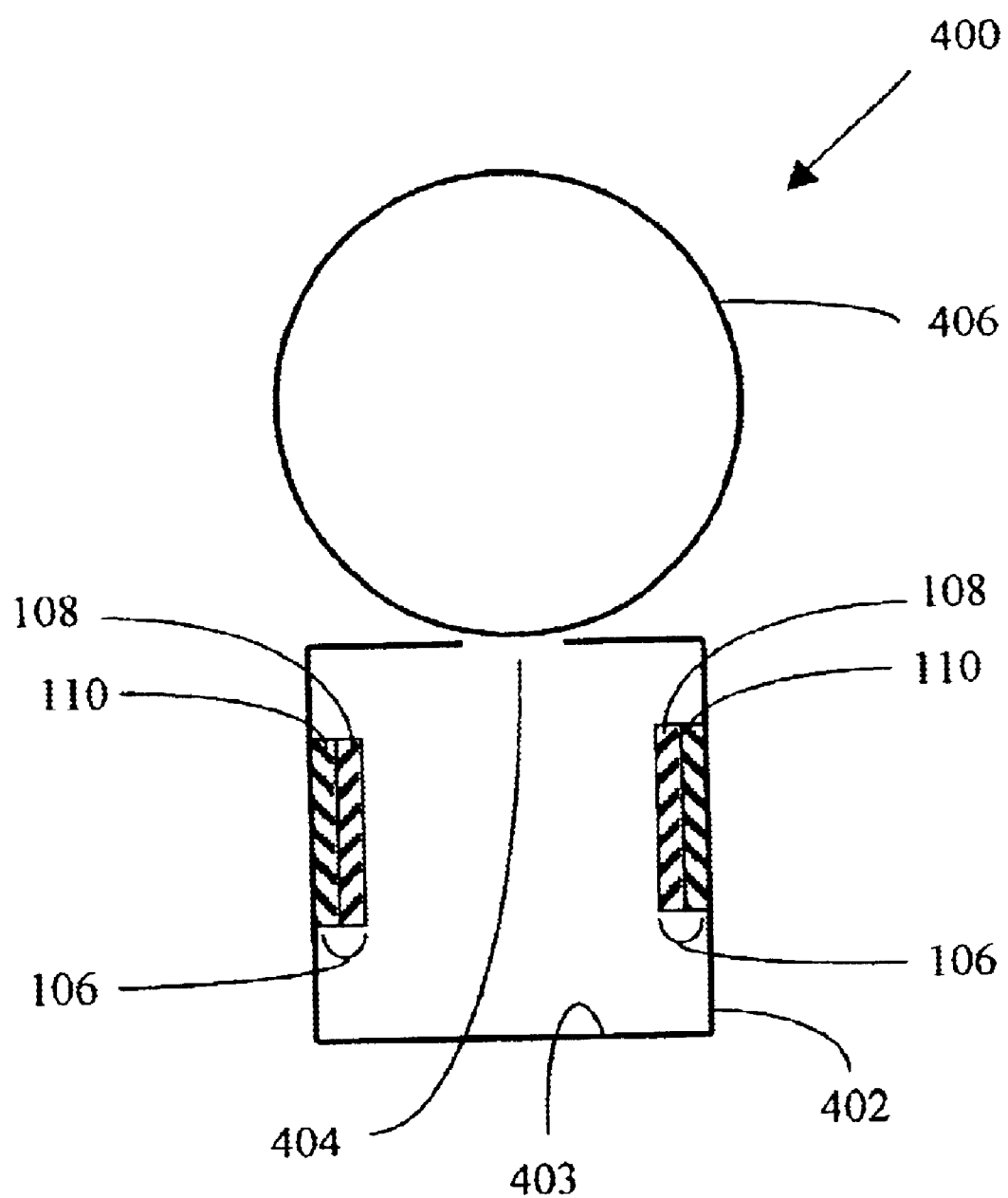
FIG. 10 is a cross-sectional side view of another embodiment of the present invention with two light emitting diodes and a refracting collimating element.
Figure 11:
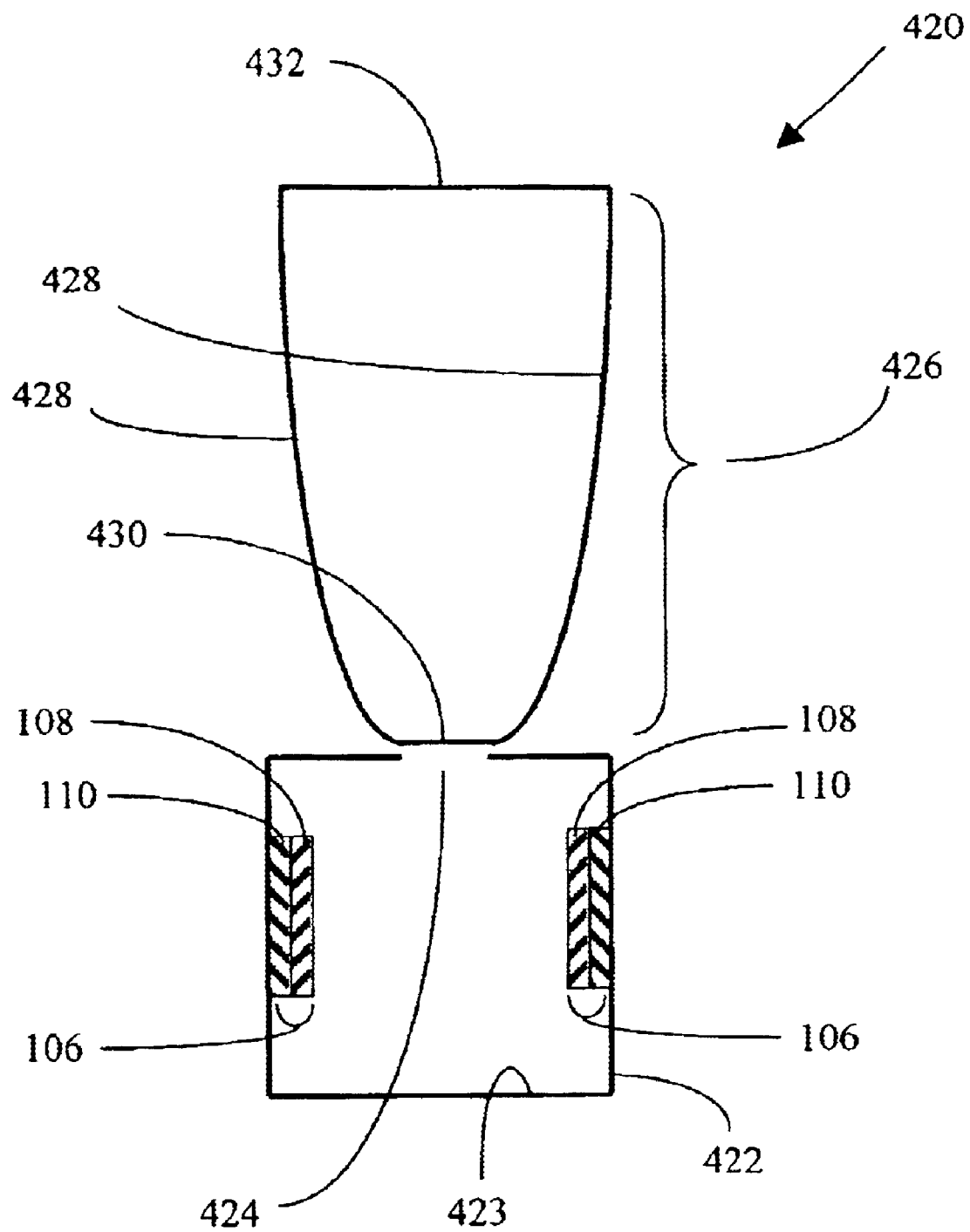
FIG. 11 is a cross-sectional side view of another embodiment of the present invention with two light emitting diodes and a reflecting collimating element.
Figure 12:
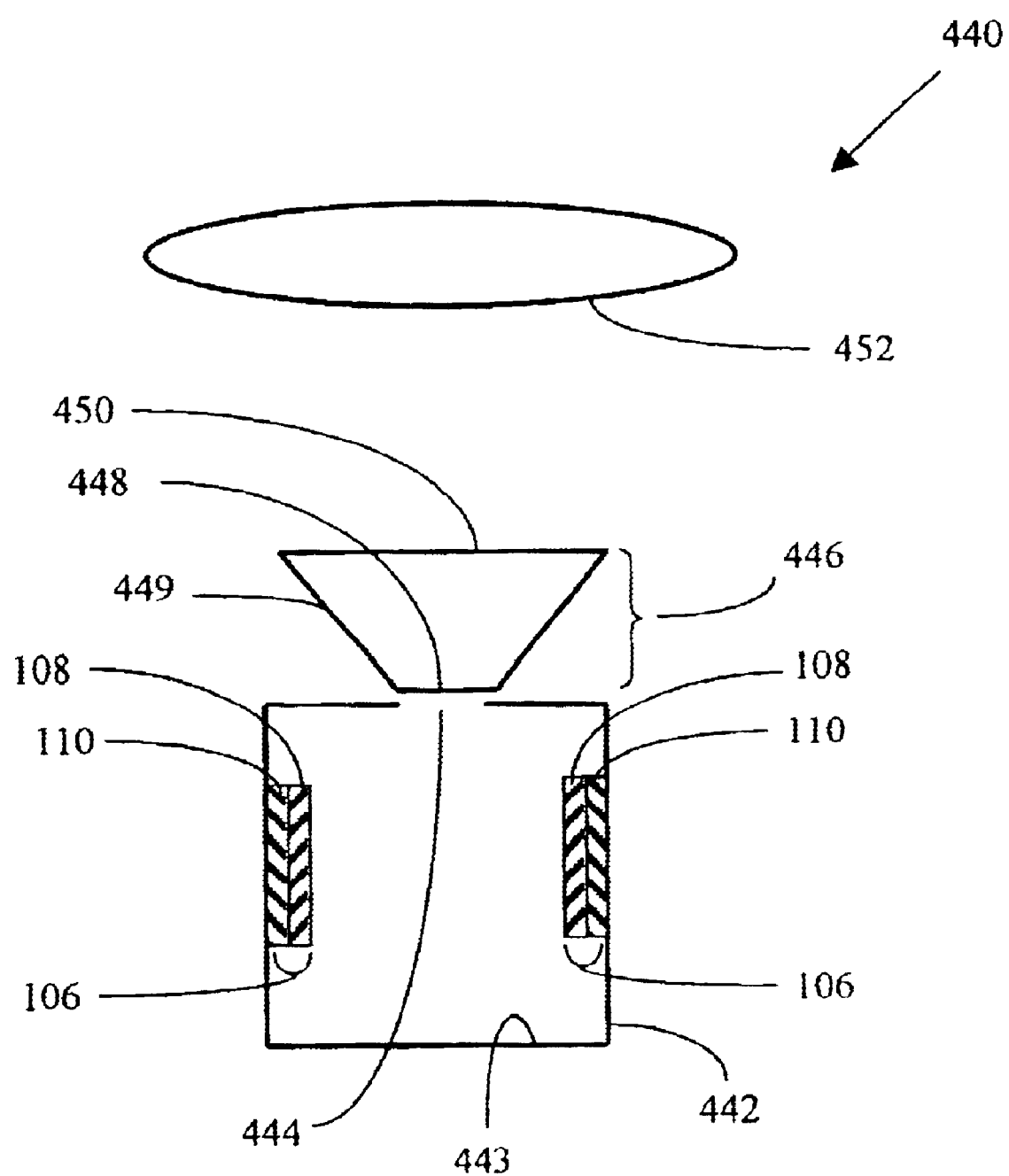
FIG. 12 is a cross-sectional side view of another embodiment of the present invention with two light emitting diodes and two collimating elements.
Figure 13:
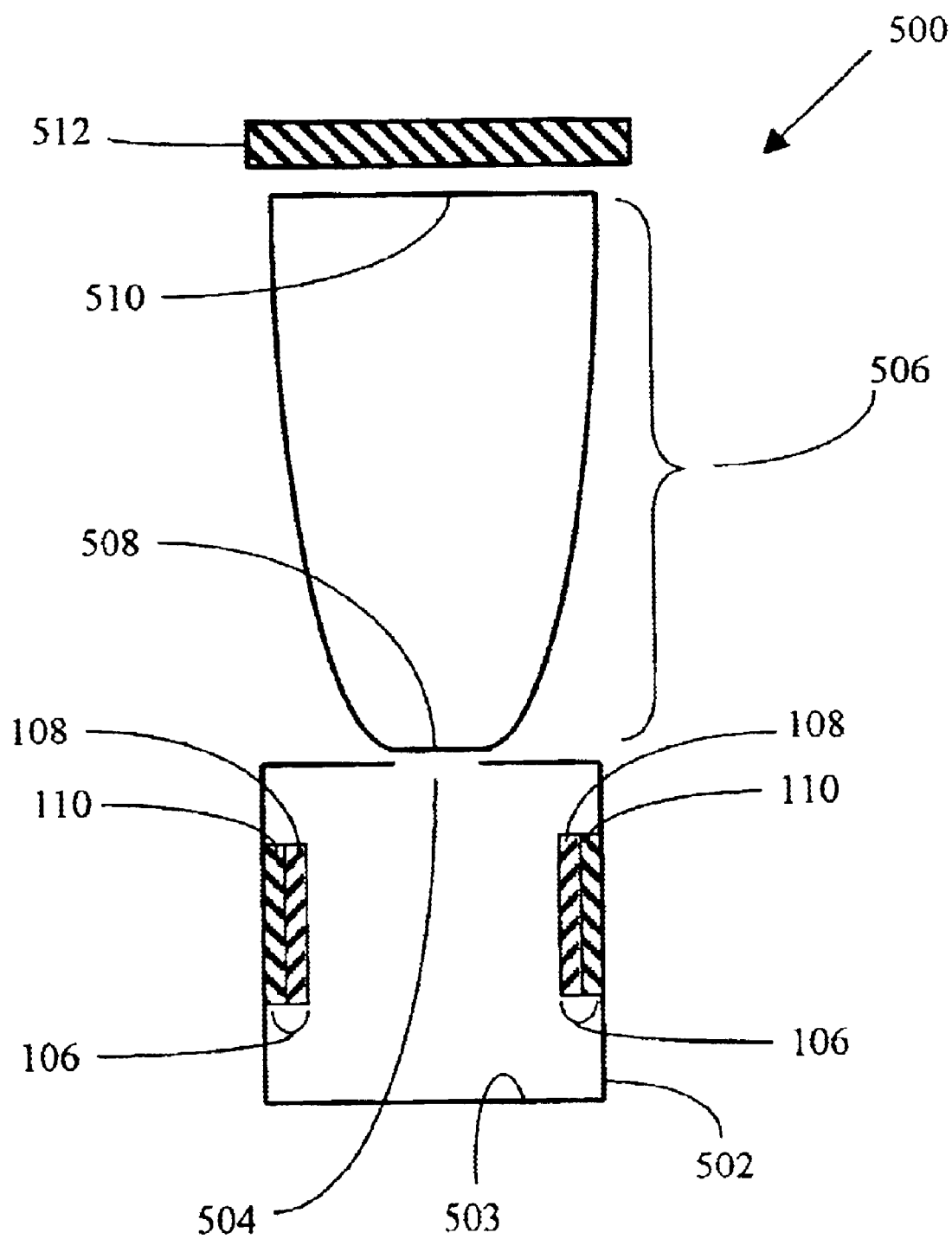
FIG. 13 is a cross-sectional side view of another embodiment of the present invention with two light emitting diodes, a reflecting collimating element and a partially reflecting optical element.
Figure 14:
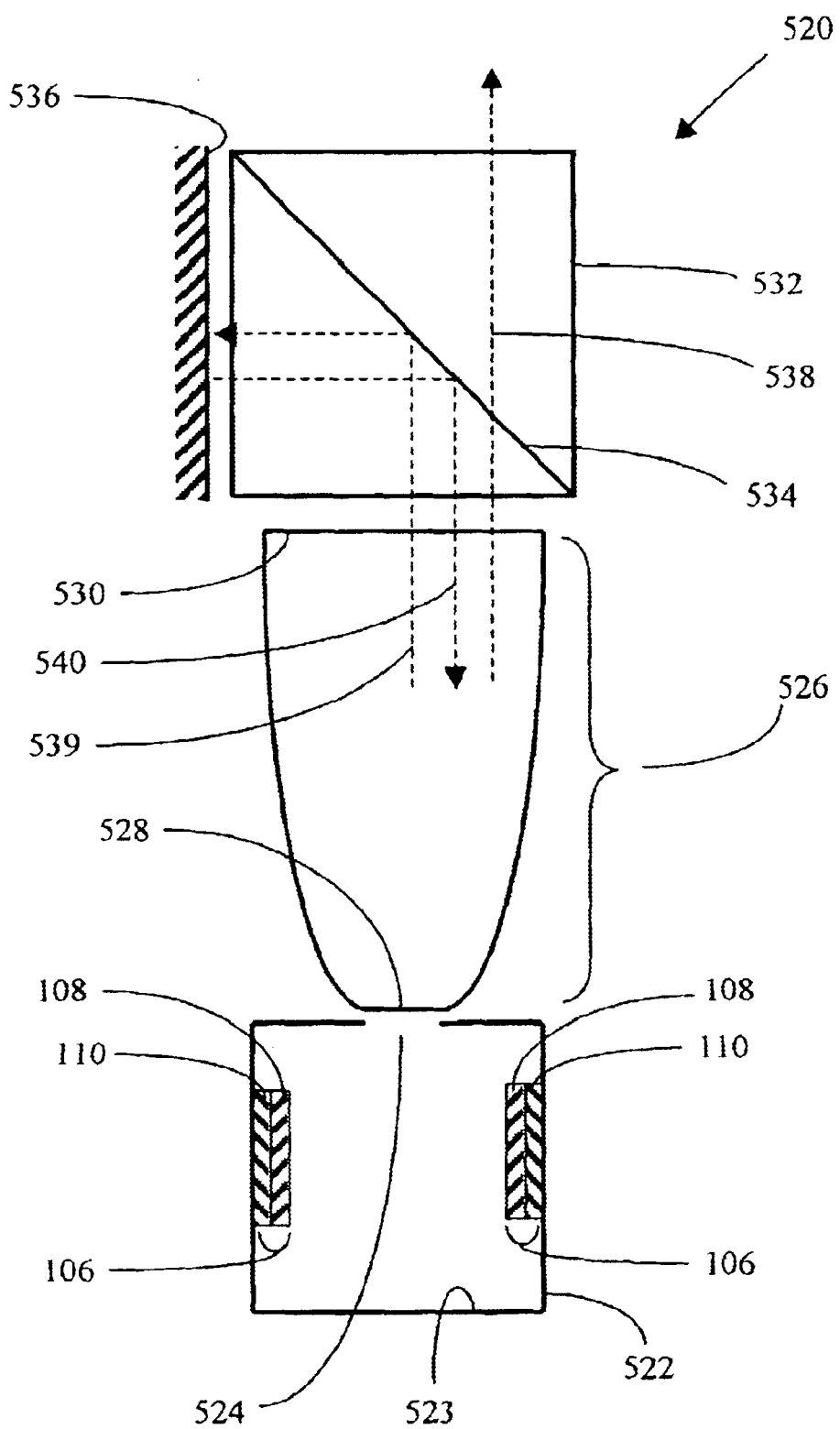
FIG. 14 is a cross-sectional side view of another embodiment of the present invention with two light emitting diodes, a reflecting collimating element and a partially reflecting optical element.
Figure 15:
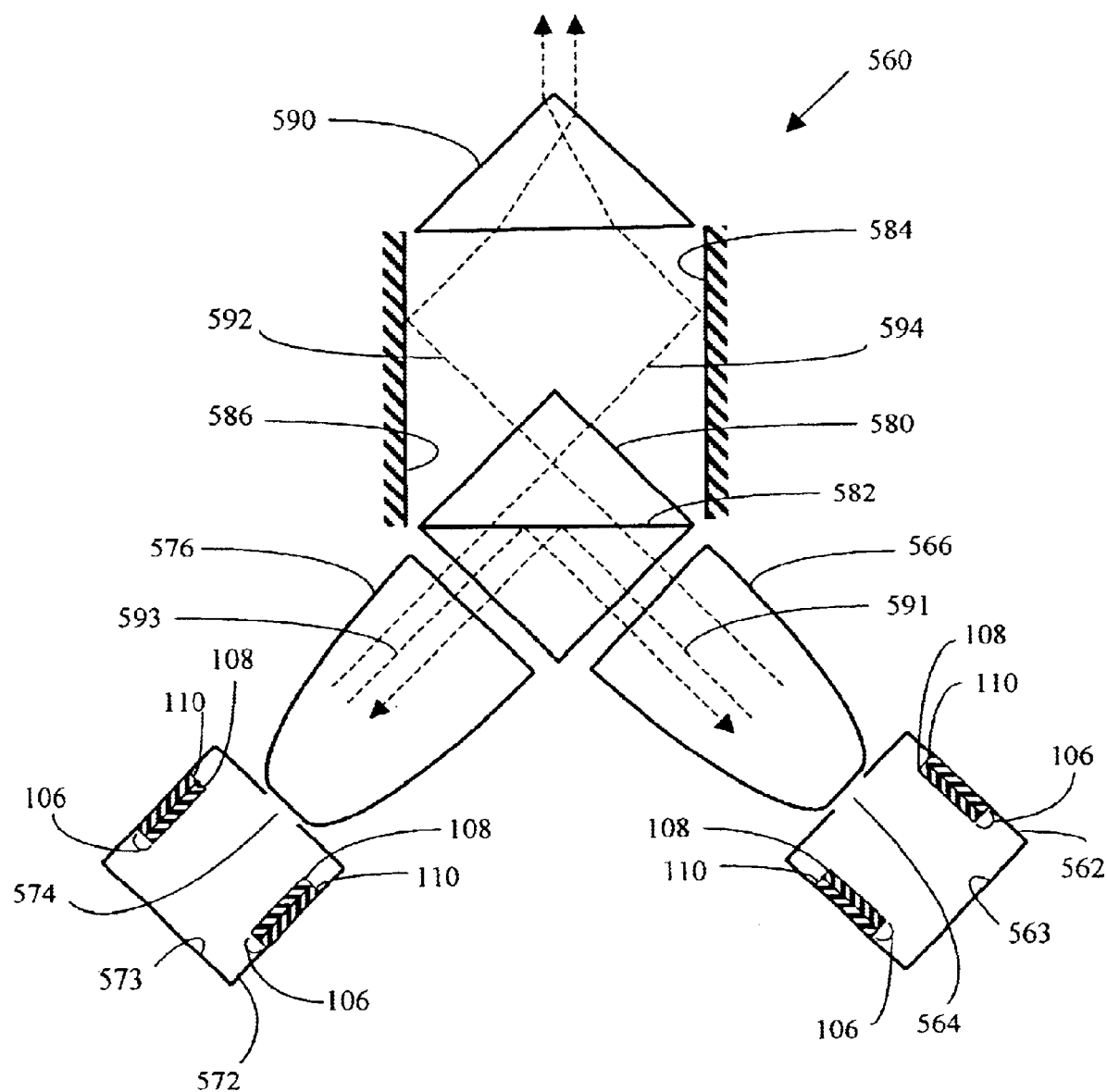
FIG. 15 is a cross-sectional side view of another embodiment of the present invention with two optical illumination systems that share a partially reflecting optical element.

In FIGS. 3–15, the light emitting diodes 106 are enclosed in a light-reflecting cavity that has one light output aperture of area $A_O$ located in a surface of the light-reflecting cavity. It is also within the scope of this invention, however, that a light-reflecting cavity may have more than one light output aperture. In the latter case, the area $A_O$ refers to the total area of all the apertures in a light-reflecting cavity. In FIG. 3, the light-reflecting cavity 102 has inside surfaces 103 and light output aperture 104. In FIG. 4, the light-reflecting cavity 122 has inside surfaces 123 and light output aperture 124. In FIG. 5, the light-reflecting cavity 142 has inside surfaces 143 and light output aperture 144. In FIG. 6, the light-reflecting cavity 162 has inside surfaces 163 and light output aperture 164. In FIG. 7, the light-reflecting cavity 202 has inside surfaces 203 and light output aperture 204. In FIG. 8, the light-reflecting cavity 222 has inside surfaces 223 and light output aperture 224. In FIG. 9, the light-reflecting cavity 302 has inside surfaces 303 and light output aperture 304. In FIG. 10, the light-reflecting cavity 402 has inside surfaces 403 and light output aperture 404. In FIG. 11, the light-reflecting cavity 422 has inside surfaces 423 and light output aperture 424. In FIG. 12, the light-reflecting cavity 442 has inside surfaces 443 and light output aperture 444. In FIG. 13, the light-reflecting cavity 502 has inside surfaces 503 and light output aperture 504. In FIG. 14, the light-reflecting cavity 522 has inside surfaces 523 and light output aperture 524. In FIG. 15, the light-reflecting cavity 562 has inside surfaces 563 and light output aperture 564 and, in addition, the light-reflecting cavity 572 has inside surfaces 573 and light output aperture 574.

For simplicity, the light-reflecting cavities 102, 122, 142, 162, 202, 222, 302, 402, 422, 442, 502, 522, 562 and 572 in FIGS. 3–15 are shown to have square, rectangular or trapezoidal shapes as seen in "top view" or "side view." However, it is within the scope of this invention that the light-reflecting cavities 102, 122, 142, 162, 202, 222, 302, 402, 422, 442, 502, 522, 562 and 572 may have any shape, both regular and irregular. Examples of possible cross-sectional shapes include a square, a rectangle, a polygon, a circle, an ellipse, an arbitrary facetted shape or an arbitrary curved shape.

The light output apertures 104, 124, 144, 164, 204, 224, 304, 404, 424, 444, 504, 524, 564 and 574 are shown, for simplicity, to be either squares or rectangles in FIGS. 3–15. It is within the scope of this invention that the light output apertures 104, 124, 144, 164, 204, 224, 304, 404, 424, 444, 504, 524, 564 and 574 may have any shape including, but not limited to, a square, a rectangle, a polygon, a circle, an ellipse, an arbitrary facetted shape or an arbitrary curved shape.

The area $A_O$ of the light output aperture 104, 124, 144, 164, 204, 224, 304, 404, 424, 444, 504, 524, 564 or 574 should be less than the total area $A_S$ of the light emitting diodes 106 within the respective light-reflecting cavity 102, 122, 142, 162, 202, 222, 302, 402, 422, 442, 502, 522, 562 or 572. The area $A_O$ of the light output aperture must be less than the total area $A_S$ of the light emitting diodes 106 in order for the output luminance $L_O$ to be greater than the intrinsic luminance $L_I$ of the light emitting diodes 106. The luminance enhancement due to light recycling is given by the ratio $L_O/L_I$. The maximum theoretical luminance enhancement is given by the quotient of the areas $A_S/A_O$. For example, if $A_S=20$ mm$^2$ and $A_O=1$ mm$^2$, then the maximum theoretical luminance enhancement is $A_S/A_O=20$. The maximum value for $L_O/L_I$ of $A_S/A_O$ is achieved only if the light emitting diodes 106 are Lambertian emitters and only if the reflectivity of the sources, $R_S$, and the reflectivity of the inner surfaces of the light-reflecting cavity, $R_C$, are both equal to 100%. Note that a Lambertian emitter is an emitter that has a constant luminance or brightness for all emitting angles. If the light emitting diodes 106 are not perfect Lambertian emitters or if $R_S$ and $R_C$ are each less than 100%, as is normally the case, luminance enhancement can still be achieved but the enhancement will be less than the maximum theoretical value. Preferably the area $A_O$ of the light output aperture 104, 124, 144, 164, 204, 224, 304, 404, 424, 444, 504, 524, 564 or 574 should be less than or equal to 50% the total area $A_S$ of the light emitting diodes 106 within the respective light-reflecting cavity 102, 122, 142, 162, 202, 222, 302, 402, 422, 442, 502, 522, 562 or 572. More preferably the area $A_O$ of the light output aperture 104, 124, 144, 164, 204, 224, 304, 404, 424, 444, 504, 524, 564 or 574 should be less than or equal to 25% the total area $A_S$ of the light emitting diodes 106 within the respective light-reflecting cavity 102, 122, 142, 162, 202, 222, 302, 402, 422, 442, 502, 522, 562 or 572. Most preferably the area $A_O$ of the light output aperture 104, 124, 144, 164, 204, 224, 304, 404, 424, 444, 504, 524, 564 or 574 should be less than or equal to 10% the total area $A_S$ of the light emitting diodes 106 within the respective light-reflecting cavity 102, 122, 142, 162, 202, 222, 302, 402, 422, 442, 502, 522, 562 or 572. In addition, for some applications it is desirable that the area $A_O$ of the light output aperture 104, 124, 144, 164, 204, 224, 304, 404, 424, 444, 504, 524, 564 or 574 be small and comparable in size to the area of an arc lamp source. For those applications, preferably the area $A_O$ of the light output aperture 104, 124, 144, 164, 204, 224, 304, 404, 424, 444, 504, 524, 564 or 574 should be less than 25 mm$^2$ and, more preferably, the area $A_O$ of the light output aperture 104, 124, 144, 164, 204, 224, 304, 404, 424, 444, 504, 524, 564 or 574 should be less than 10 mm$^2$.

The interior volumes of the light-reflecting cavities 102, 122, 142, 162, 202, 222, 302, 402, 422, 442, 502, 522, 562 and 572 may be a vacuum, may be filled with air or other light transmitting gas, may be filled with a light transmitting liquid, or may be filled or partially filled with a transparent or semi-transparent solid. Examples of transparent solids include glasses such as silicon dioxide or plastics such as polymethylmethacrylate, polystrene, polycarbonate or a silicone-containing material.

The interior surfaces 103, 123, 143, 163, 203, 223, 303, 403, 423, 443, 503, 523, 563 and 573 of the respective light-reflecting cavities 102, 122, 142, 162, 202, 222, 302, 402, 422, 442, 502, 522, 562 and 572 in FIGS. 3–15 are either formed from a material that reflects light or coated with a material that reflects light. The reflective material may be a diffuse reflector, a specular reflector, or a combination of a specular and a diffuse reflector. Preferably, the reflectivity $R_C$ of the interior surfaces 103, 123, 143, 163, 203, 223, 303, 403, 423, 443, 503, 523, 563 and 573 of the light-reflective cavities is at least 50%. More preferably, the reflectivity $R_C$ of the interior surfaces 103, 123, 143, 163, 203, 223, 303, 403, 423, 443, 503, 523, 563 and 573 of the light-reflective cavities is at least 75%. Most preferably, the reflectivity $R_C$ of the interior surfaces 103, 123, 143, 163, 203, 223, 303, 403, 423, 443, 503, 523, 563 and 573 of the light-reflective cavities is at least 90%. The total inside area of a light reflective cavity 102, 122, 142, 162, 202, 222, 302, 402, 422, 442, 502, 522, 562 and 572 is denoted as $A_T$, which includes the total area $A_S$ of the light emitting diodes and the area $A_O$ of the output aperture. The portion of the total inside area $A_T$ that is covered by reflective material and is not covered by either the light emitting diodes 106 or the output aperture is denoted as $A_C$. In order to maximize the efficiency of the illumination system, the area $A_C$ should be minimized. Minimizing $A_C$ minimizes the volume of the light-reflecting cavity and minimizes the number of reflections that light must make in order to escape the cavity through the light output aperture.

Diffuse reflectors can be made that have very high reflectivity (for example, greater than 95% or greater than 98%). However, diffuse reflectors with high reflectivity are generally quite thick. For example, diffuse reflectors with reflectivity greater than 98% are typically several millimeters thick. Examples of diffuse reflectors include, but are not limited to, fluoropolymer materials such as Spectralon™ from Labsphere, Inc. and polytetrafluoroethylene film from manufacturers such as Fluorglas (sold under the trade name Furon™), W. L Gore and Associates, Inc. (sold under the trade name DR™), or E. I. du Pont de Nemours & Company (sold under the trade name of Teflon™), films of barium sulfate, porous polymer films containing tiny air channels such as polyethersulfone and polypropylene filter materials made by Pall Gelman Sciences, and polymer composites utilizing reflective filler materials such as, for example, titanium dioxide. An example of the latter polymer composite material is titanium-dioxide-filled ABS (acrylonitrile-butadiene-styrene terpolymer) produced by RTP. In the case that a polymer composite material is employed as a reflective material, such as titanium dioxide filled ABS, the light-reflecting cavity 102, 122, 142, 162, 202, 222, 302, 402, 422, 442, 502, 522, 562 or 572 can be formed from the polymer composite material and a separate reflective layer is not needed.

Most specular reflective materials have reflectivity ranging from about 80% to about 98.5%. Examples of specular reflective materials include, but are not limited to, Silverlux™, a product of 3M Corporation, and other carrier films of plastic that have been coated with a thin metallic layer such as silver, aluminum or gold. The thickness of the metallic coating may range from about 0.05 micrometers to about 0.1 millimeter, depending on the materials used and the method of manufacturing the metal coating. Other examples of specular reflective films that have high reflectivity include photonic bandgap reflective materials and Vikuiti™ ESR (Enhanced Specular Reflector) made by 3M Corporation. The ESR film has a reflectivity of greater than 98% across the visible light spectrum.

An example of a combination of specular and diffuse reflective materials is one or more layers of a diffuse reflector that is backed by a specular reflector. The use of a combination of specular and diffuse reflective materials may result in higher reflectivity in a thinner layer than is possible using a diffuse reflective material alone.

Figure 3A:
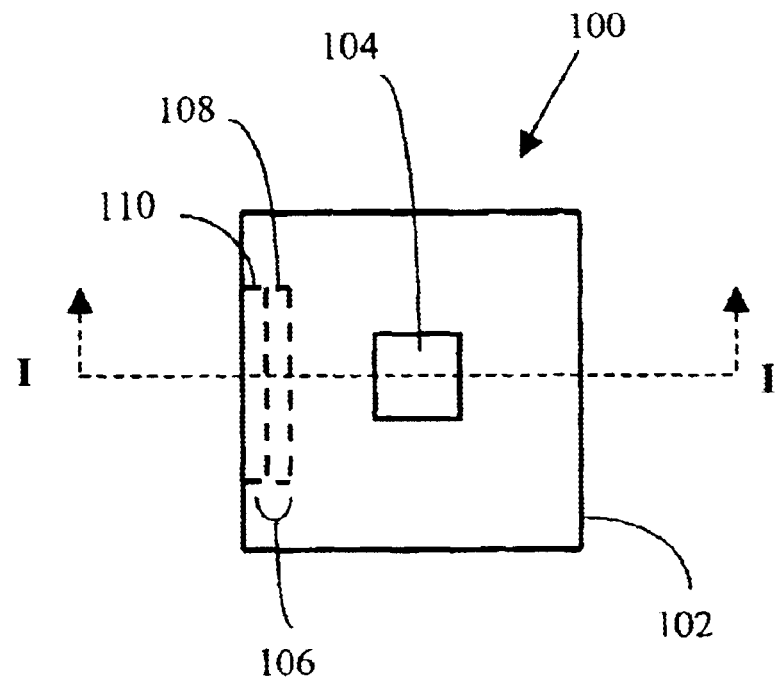
FIGS. 3A–3B are, respectively, a top view and a cross-sectional side view (I—I) of one embodiment of the present invention having one light emitting diode.
Figure 3B:
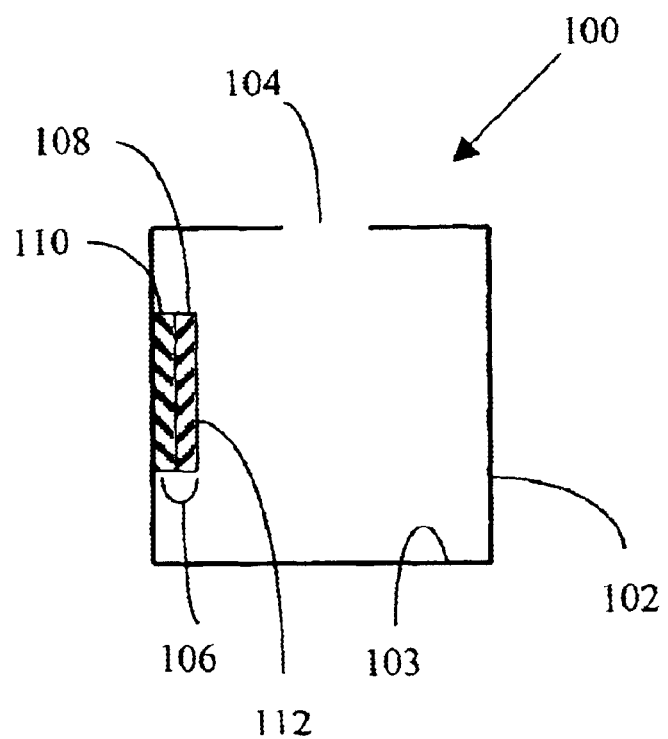

One embodiment of the present invention is illumination system 100 shown both in top view in FIG. 3A and in a cross-sectional side view (I—I) in FIG. 3B. It should be noted that the drawing is merely a representation of the structure; the actual and relative dimensions may be different. One component of illumination system 100 is a light emitting diode 106. The emitting area of light emitting diode 106 is area $A_S$. To illustrate the emitting and reflecting functions in FIGS. 3A–3B, light emitting diode 106 is shown to consist of emitting volume 108 and a reflecting element 110. Light may be emitted from emitting volume 108 through one or more of the exterior surfaces of emitting volume 108. For example, light may be emitted through surface 112. Light emitting diode 106 also reflects light. For example, light may enter light emitting diode 106 through surface 112, pass through emitting volume 108, strike reflecting element 110, be reflected back through emitting volume 108 and exit surface 112. The reflectivity of reflecting element 110 of light emitting diode 106 is $R_S$. The reflectivity $R_S$ of reflecting element 110 is preferably at least 50%. More preferably, the reflectivity $R_S$ of reflecting element 110 is at least 75%. Most preferably, the reflectivity $R_S$ of reflecting element 110 is at least 90%. The total inside area of the light-reflecting cavity is $A_T$ and the area of the light output aperture 104 is area $A_O$. The area $A_O$ of the light output aperture 104 is less than the area $A_S$ of the light emitting diode 106. Preferably the area $A_O$ of the light output aperture 104 is less than or equal to 50% of the total area $A_S$ of the light emitting diode 106. More preferably the area $A_O$ of the light output aperture 104 is less than or equal to 25% the total area $A_S$ of the light emitting diode 106. Most preferably the area $A_O$ of the light output aperture 104 is less than or equal to 10% the total area $A_S$ of the light emitting diode 106. The inside surfaces 103 of light-reflecting cavity 102 that are not covered by the light emitting diode 106 reflect light and have reflectivity $R_C$ The reflectivity $R_C$ of the inside surfaces 103 is preferably at least 50%. More preferably, the reflectivity $R_C$ of the inside surfaces 103 is at least 75%. Most preferably, the reflectivity $R_C$ of the inside surfaces 103 is at least 90%.

Figure 4A:
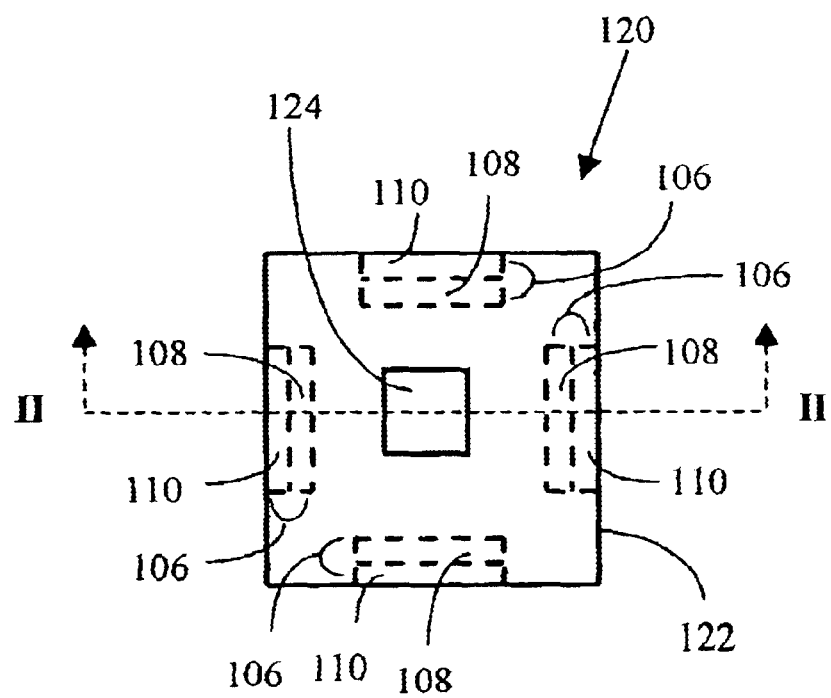
FIGS. 4A–4B are, respectively, a top view and a cross-sectional side view (II—II) of another embodiment of the present invention with four light emitting diodes.
Figure 4B:
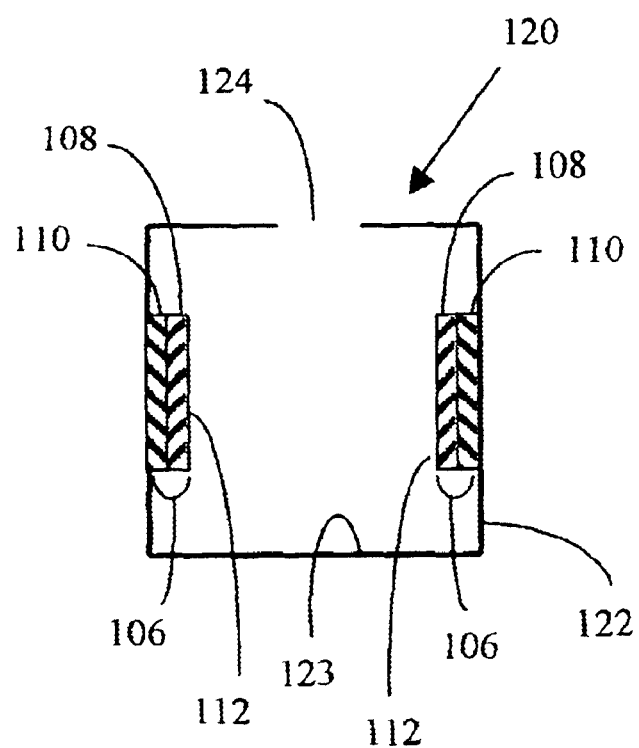

Another embodiment of the present invention is illumination system 120 shown both in top view in FIG. 4A and in a cross-sectional side view (II—II) in FIG. 4B. It should be noted that the drawing is merely a representation of the structure; the actual and relative dimensions may be different. Illumination system 120 has four light emitting diodes 106. Only two of the four light emitting diodes are visible in the cross-section shown in FIG. 4B. The total emitting area of the four light emitting diodes 106 is area $A_S$. To illustrate the emitting and reflecting functions in FIGS. 4A–4B, light emitting diodes 106 are shown to consist of emitting volumes 108 and reflecting elements 110. Light may be emitted from emitting volume 108 through one or more of the exterior surfaces of emitting volume 108. For example, light may be emitted through surfaces 112. Light emitting diodes 106 also reflect light. For example, light may enter a light emitting diode 106 through surface 112, pass through emitting volume 108, strike reflecting element 110, be reflected back through emitting volume 108 and exit surface 112. The reflectivity of reflecting elements 110 of light emitting diodes 106 is $R_S$. The reflectivity $R_S$ of reflecting elements 110 is preferably at least 50%. More preferably, the reflectivity $R_S$ of reflecting elements 110 is at least 75%. Most preferably, the reflectivity $R_S$ of reflecting elements 110 is at least 90%. The total inside area of the light-reflecting cavity is $A_T$ and the area of the light output aperture 124 is area $A_O$. The area $A_O$ of the light output aperture 124 is less than the total area $A_S$ of the four light emitting diodes 106. Preferably the area $A_O$, of the light output aperture 124 is less than or equal to 50% of the total area $A_S$ of the four light emitting diodes 106. More preferably the area $A_O$ of the light output aperture 124 is less than or equal to 25% the total area $A_S$ of the four light emitting diodes 106. Most preferably the area $A_O$ of the light output aperture 124 is less than or equal to 10% the total area $A_S$ of the four light emitting diodes 106. The inside surfaces 123 of light-reflecting cavity 122 that are not covered by the four light emitting diodes 106 reflect light and have reflectivity $R_C$. The reflectivity $R_C$ of the inside surfaces 123 is preferably at least 50%. More preferably, the reflectivity $R_C$ of the inside surfaces 123 is at least 75%. Most preferably, the reflectivity $R_C$ of the inside surfaces 123 is at least 90%.

Figure 5A:
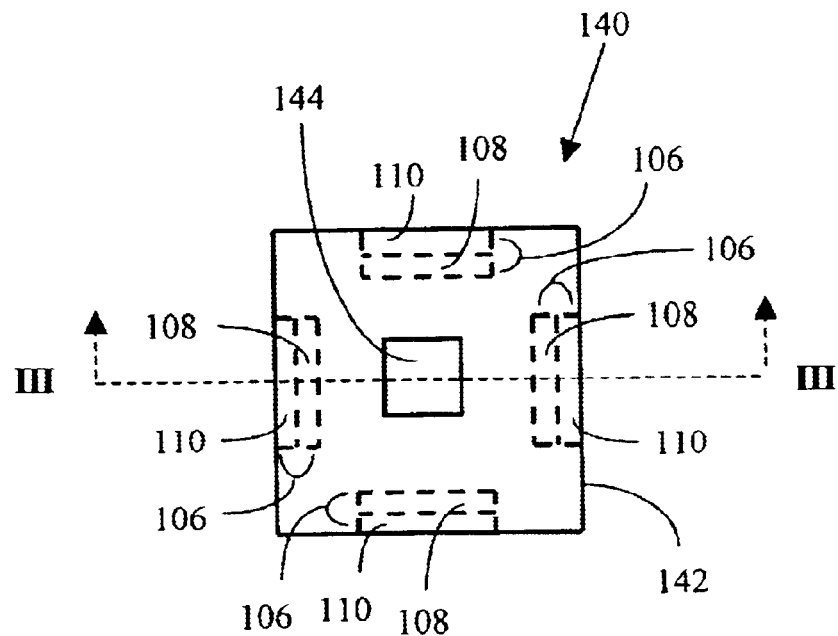
FIGS. 5A–5B are, respectively, a top view and a cross-sectional side view (III—III) of another embodiment of the present invention with eight light emitting diodes.
Figure 5B:
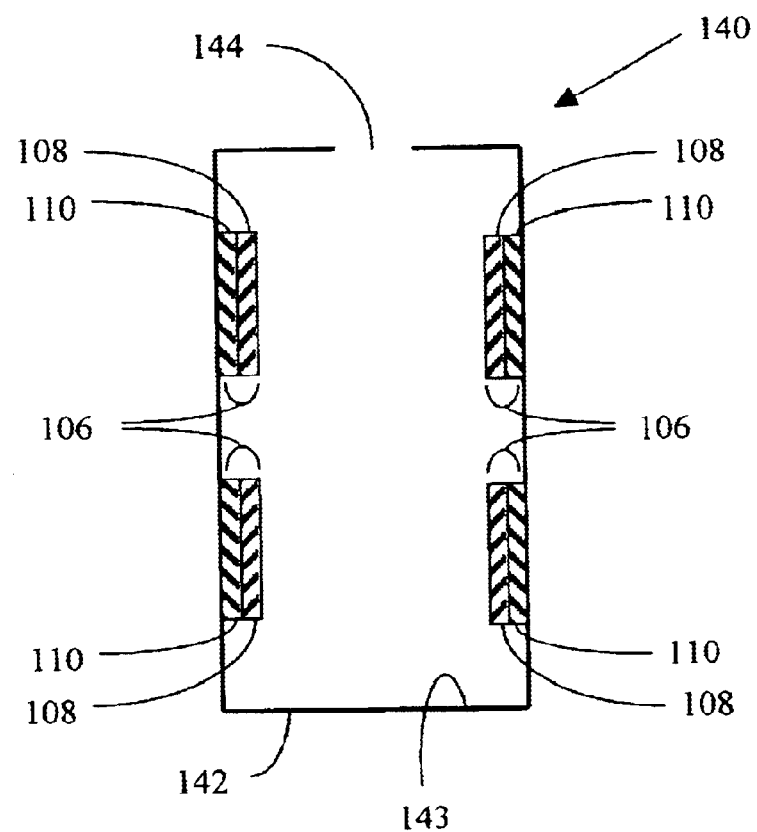

Another embodiment of the present invention is illumination system 140 shown both in top view in FIG. 5A and in a cross-sectional side view (III—III) in FIG. 5B. Illumination system 140 is similar to illumination system 120 in FIGS. 4A–4B except that illumination system 140 has eight light emitting diodes 106 instead of four. Only four of the eight light emitting diodes are visible in the cross-section shown in FIG. 5B. The total emitting area of the eight light emitting diodes 106 is area $A_S$. The eight light emitting diodes 106 are enclosed in light-reflecting cavity 142 having inside surfaces 143 and light output aperture 144. The total inside area of the light-reflecting cavity 142 is $A_T$ and the area of the light output aperture 144 is area $A_O$. The area $A_O$ of the light output aperture 144 is less than the total area $A_S$ of the eight light emitting diodes 106. The inside surfaces 143 of light-reflecting cavity 142 that are not covered by the eight light emitting diodes 106 reflect light and have reflectivity $R_C$.

Figure 6A:
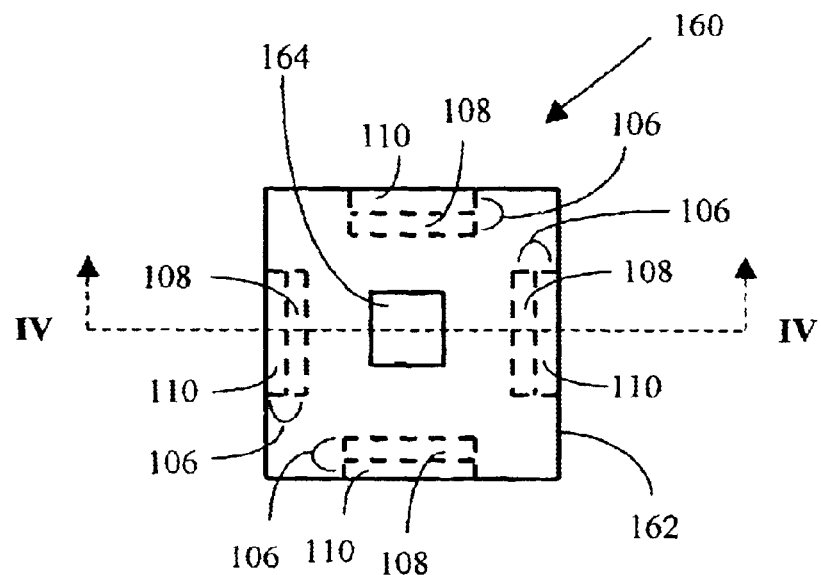
FIGS. 6A–6B are, respectively, a top view and a cross-sectional side view (IV—IV) of another embodiment of the present invention with twelve light emitting diodes.
Figure 6B:
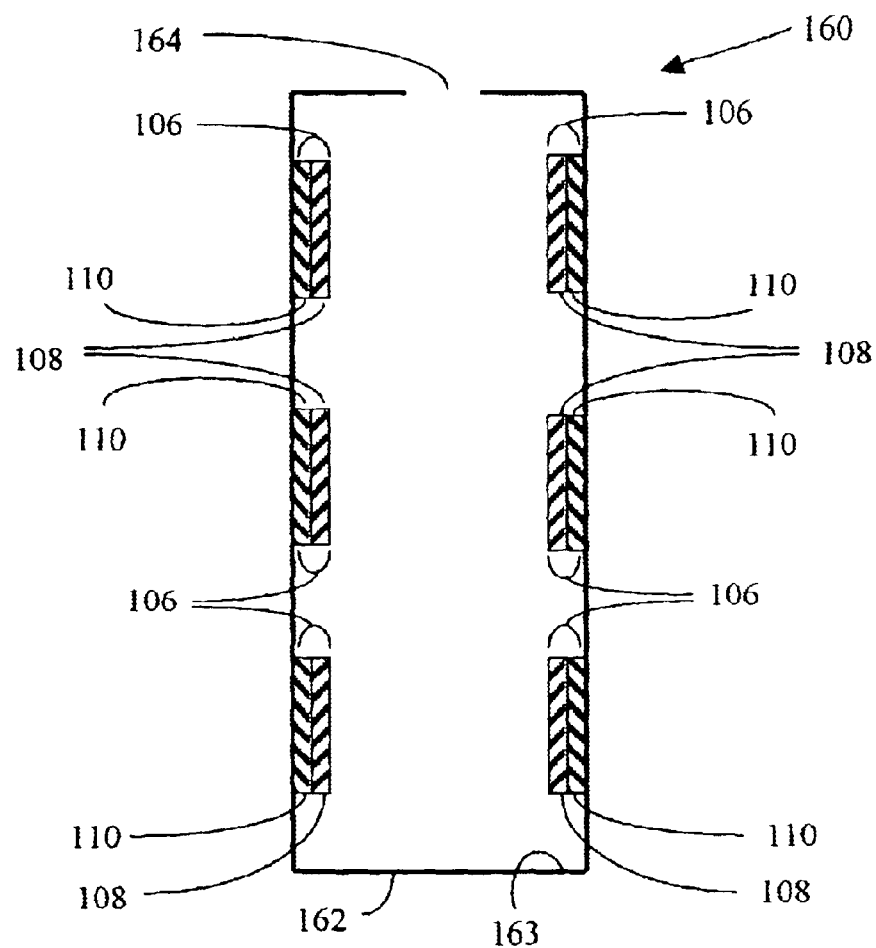

Another embodiment of the present invention is illumination system 160 shown both in top view in FIG. 6A and in a cross-sectional side view (IV—IV) in FIG. 6B. Illumination system 160 is similar to illumination system 120 in FIGS. 4A–4B and illumination system 140 in FIGS. 5A–5B except that illumination system 160 has twelve light emitting diodes 106 instead of the four or eight light emitting diodes 106 shown in the previous figures. Only six of the twelve light emitting diodes are visible in the cross-section shown in FIG. 6B. The total emitting area of the twelve light emitting diodes 106 is area $A_S$. The twelve light emitting diodes 106 are enclosed in light-reflecting cavity 162 having inside surfaces 163 and light output aperture 164. The total inside area of the light-reflecting cavity 162 is $A_T$ and the area of the light output aperture 164 is area $A_O$. The area $A_O$ of the light output aperture 164 is less than the total area $A_S$ of the twelve light emitting diodes 106. The inside surfaces 163 of light-reflecting cavity 162 that are not covered by the twelve light emitting diodes 106 reflect light and have reflectivity $R_C$.

Figure 7A:
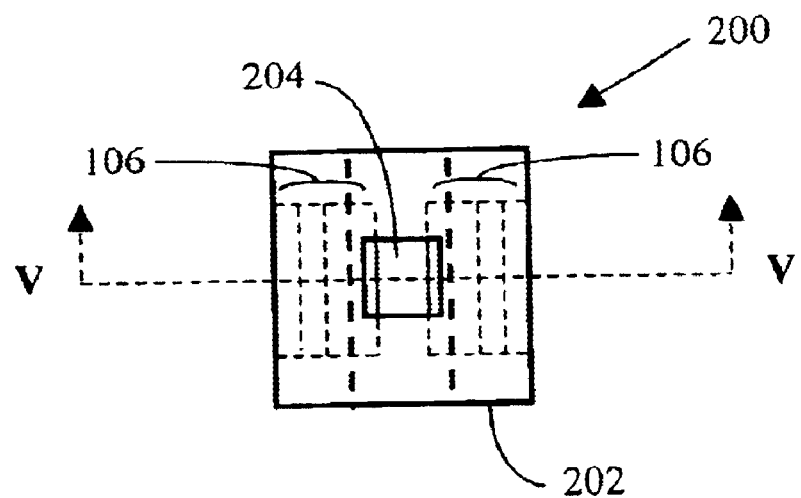
FIGS. 7A–7B are, respectively, a top view and a cross-sectional side view (V—V) of another embodiment of the present invention with two light emitting diodes and a tapered light-reflecting cavity.
Figure 7B:
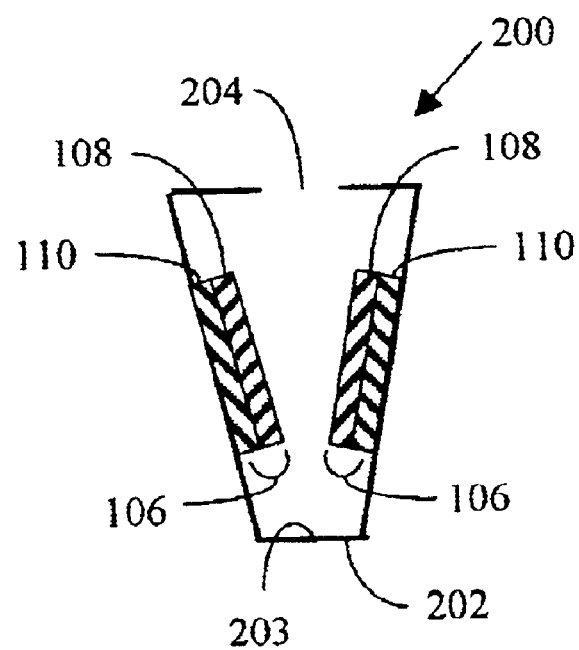

Another embodiment of the present invention is illumination system 200 shown both in top view in FIG. 7A and in a cross-sectional side view (V—V) in FIG. 7B. The light-reflecting cavity 202 is tapered as shown in FIG. 7B. The cross-sectional area of light-reflecting cavity 202 measured in a plane parallel to the output aperture 204 is larger when the plane is adjacent to the output aperture 204 than it is when the plane is distal from the output aperture 204. Illumination system 200 has two light emitting diodes 106. The total emitting area of the two light emitting diodes 106 is area $A_S$. To illustrate the emitting and reflecting functions in FIGS. 7A–7B, light emitting diodes 106 are shown to consist of emitting volumes 108 and reflecting elements 110. Light may be emitted from emitting volume 108 through one or more of the exterior surfaces of emitting volume 108. Light emitting diodes 106 also reflect light via reflecting elements 110 having reflectivity $R_S$. The reflectivity $R_S$ of reflecting elements 110 is preferably at least 50%. More preferably, the reflectivity $R_S$ of reflecting elements 110 is at least 75%. Most preferably, the reflectivity $R_S$ of reflecting elements 110 is at least 90%. The total inside area of the light-reflecting cavity 202 is $A_T$ and the area of the light output aperture 204 is area $A_O$. The area $A_O$ of the light output aperture 204 is less than the total area $A_S$ of the two light emitting diodes 106. Preferably the area $A_O$ of the light output aperture 204 is less than or equal to 50% of the total area $A_S$ of the two light emitting diodes 106. More preferably the area $A_O$ of the light output aperture 204 is less than or equal to 25% the total area $A_S$ of the two light emitting diodes 106. Most preferably the area $A_O$ of the light output aperture 204 is less than or equal to 10% the total area $A_S$ of the two light emitting diodes 106. The inside surfaces 203 of light-reflecting cavity 202 that are not covered by the two light emitting diodes 106 reflect light and have reflectivity $R_C$. The reflectivity $R_C$ of the inside surfaces 203 is preferably at least 50%. More preferably, the reflectivity $R_C$ of the inside surfaces 203 is at least 75%. Most preferably, the reflectivity $R_C$ of the inside surfaces 203 is at least 90%.

Figure 8A:
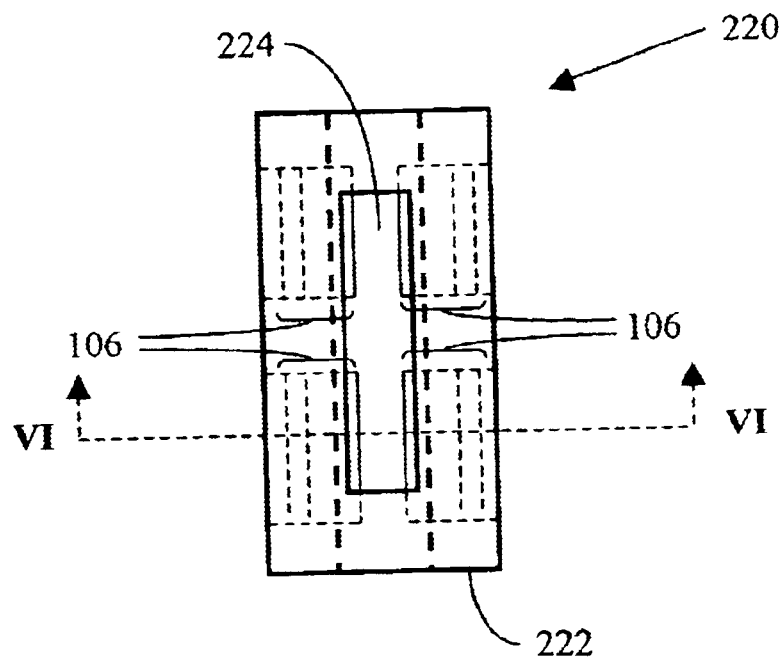
FIGS. 8A–8B are, respectively, a top view and a cross-sectional side view (VI—VI) of another embodiment of the present invention with four light emitting diodes and a tapered light-reflecting cavity.
Figure 8B:
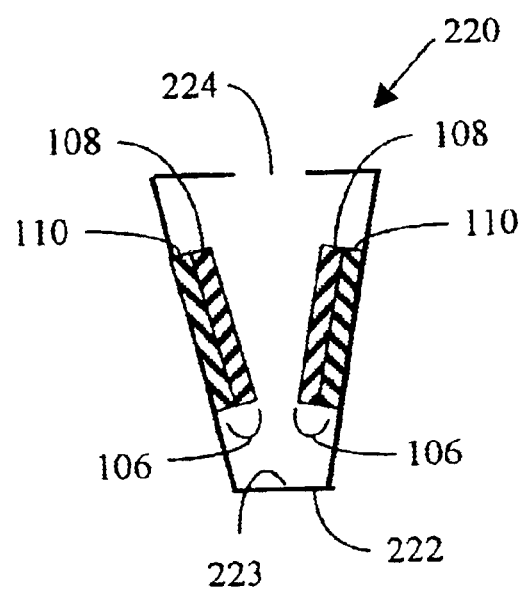

Another embodiment of the present invention is illumination system 220 shown both in top view in FIG. 8A and in a cross-sectional side view (VI—VI) in FIG. 8B. The light-reflecting cavity 222 is tapered as shown in FIG. 8B. Illumination system 220 is similar to illumination system 200 in FIGS. 7A–7B except that illumination system 220 has four light emitting diodes 106 instead of two. Only two light emitting diodes are visible in the cross-section shown in FIG. 8B. The total emitting area of the four light emitting diodes 106 is area $A_S$. The four light emitting diodes 106 are enclosed in light-reflecting cavity 222 having inside surfaces 223 and a rectangular light output aperture 224. The total inside area of the light-reflecting cavity 222 is $A_T$ and the area of the light output aperture 224 is area $A_O$. The area $A_O$ of the light output aperture 224 is less than the total area $A_S$ of the four light emitting diodes 106. The inside surfaces 223 of light-reflecting cavity 222 that are not covered by the four light emitting diodes 106 reflect light and have reflectivity $R_C$.

Another embodiment of the present invention is illumination system 300 shown in a cross-sectional side view in FIG. 9. For simplicity, illumination system 300 is shown to have two light emitting diodes 106 but any number of light emitting diodes 106 is possible. The total emitting area of the two light emitting diodes 106 is area $A_S$. The two light emitting diodes 106 are enclosed in light-reflecting cavity 302 having inside surfaces 303 and a light output aperture 304. The total inside area of the light-reflecting cavity 302 is $A_T$ and the area of the light output aperture 304 is area $A_O$. The area $A_O$ of the light output aperture 304 is less than the total area $A_S$ of the two light emitting diodes 106. The inside surfaces 303 of light-reflecting cavity 302 that are not covered by the two light emitting diodes 106 reflect light and have reflectivity $R_C$. Illumination system 300 also includes a partially reflecting optical element 310 that is positioned adjacent to the light output aperture 304 and is located in the optical path of the light output from illumination system 300. Partially reflecting optical element 310 passes a first portion of the light transmitted by the light output aperture 304 and reflects a second portion of the light transmitted by the light-output aperture 304 back into the light-reflecting cavity 302, resulting in additional light recycling. The partially reflecting optical element 310 is shown in FIG. 9 to be positioned just outside the light-reflecting cavity 302 and covering the light output aperture 304. It is also within the scope of this invention that the partially reflecting optical element 310 may be located just inside the light output aperture 304 and covering the light output aperture 304. For either position of the partially reflecting optical element 310, a first portion of the light will be transmitted through partially reflecting optical element 310 and a second portion of the light will be reflected back into the light-reflecting cavity 302. Examples of partially reflecting optical element 310 include a reflective polarizer and a variable aperture having a reflective surface coating. A reflective polarizer is any polarizer that transmits one polarization state and reflects the other polarization state. Polarization states may be linear polarization states or circular polarization states. An example of a suitable reflective polarizer is Vikuiti™ Dual Brightness Enhancement Film (DBEF) made by 3M Corporation.

Another embodiment of the present invention is illumination system 400 shown in a cross-sectional side view in FIG. 10. For simplicity, illumination system 400 is shown to have two light emitting diodes 106 but any number of light emitting diodes 106 is possible. The total emitting area of the two light emitting diodes 106 is area $A_S$. The two light emitting diodes 106 are enclosed in light-reflecting cavity 402 having inside surfaces 403 and a light output aperture 404. The total inside area of the light-reflecting cavity 402 is $A_T$ and the area of the light output aperture 404 is area $A_O$. The area $A_O$ of the light output aperture 404 is less than the total area $A_S$ of the two light emitting diodes 106. The inside surfaces 403 of light-reflecting cavity 402 that are not covered by the two light emitting diodes 106 reflect light and have reflectivity $R_C$. Illumination system 400 also includes a light collimating element 406 that is positioned adjacent to the light output aperture 404 and is located in the optical path of the light output from illumination system 400. Light collimating element 406 may be any optical element that collimates or partially collimates the light passing though the light output aperture 404. Examples of light collimating elements include, but are not limited to, a refractive element such as a lens or a reflective element such as a tapered light pipe, a compound parabolic reflector or a micro-optical structure such as Vikuiti™ Dual Brightness Enhancement Film (DBEF) made by 3M Corporation. A plurality of light collimating elements may also be used to collimate or partially collimate the light. In FIG. 10, the light collimating element 406 is a convex ball lens. The light that passes through light output aperture 404 has a Lambertian (±90 degree) or near Lambertian output distribution. The light collimating element or elements preferably narrows the light output distribution to less than or equal to ±20 degrees, more preferably to less than or equal to ±10 degrees.

Another embodiment of the present invention is illumination system 420 shown in a cross-sectional side view in FIG. 11. For simplicity, illumination system 420 is shown to have two light emitting diodes 106 but any number of light emitting diodes 106 is possible. The total emitting area of the two light emitting diodes 106 is area $A_S$. The two light emitting diodes 106 are enclosed in light-reflecting cavity 422 having inside surfaces 423 and a light output aperture 424. The total inside area of the light-reflecting cavity 422 is $A_T$ and the area of the light output aperture 424 is area $A_O$. The area $A_O$ of the light output aperture 424 is less than the total area $A_S$ of the two light emitting diodes 106. The inside surfaces 423 of light-reflecting cavity 422 that are not covered by the two light emitting diodes 106 reflect light and have reflectivity $R_C$. Illumination system 420 also includes a light collimating element 426 that is positioned adjacent to the light output aperture 424 and is located in the optical path of the light output from illumination system 420. Light collimating element 426 may be any optical element that collimates or partially collimates the light passing though the light output aperture 424. In FIG. 11, the light collimating element 426 is a compound parabolic reflector. Light collimating element 426 has a light input surface 430, a light output surface 432 and reflecting sidewalls 428. Light reflections that occur at the sidewalls 428 may take place by total internal reflection or a reflective coating may cover the sidewalls 428. In order for collimation or partial collimation to occur, the area of the light output surface 432 must be larger than the area of the light input surface 430. The degree of collimation that takes place is given by the etendue equation $(n_{in}^2)(Area_{in})(\Omega_{in})=(n_{out}^2)(Area_{out})(\Omega_{out})$. If $n_{in}=n_{out}$, then the light output solid angle distribution $\Omega_{out}$ is given by $\Omega_{out}=(\Omega_{in})(Area_{in})/(Area_{out})$, where $\Omega_{in}$ is the light input solid angle distribution, $Area_{in}$ is the area of the light input surface 430 and $Area_{out}$ is the area of the light output surface 432. The light that passes through the light output aperture 424 of the light-reflecting cavity 422 has a Lambertian (±90 degrees or solid angle $\Omega=2\pi$) or near Lambertian output distribution. The light collimating element or elements preferably narrows the light output distribution to less than or equal to ±20 degrees, more preferably to less than or equal to ±10 degrees.

Another embodiment of the present invention is illumination system 440 shown in a cross-sectional side view in FIG. 12. For simplicity, illumination system 440 is shown to have two light emitting diodes 106 but any number of light emitting diodes 106 is possible. The total emitting area of the two light emitting diodes 106 is area $A_S$. The two light emitting diodes 106 are enclosed in light-reflecting cavity 442 having inside surfaces 443 and a light output aperture 444. The total inside area of the light-reflecting cavity 442 is $A_T$ and the area of the light output aperture 444 is area $A_O$. The area $A_O$ of the light output aperture 444 is less than the total area $A_S$ of the two light emitting diodes 106. The inside surfaces 443 of light-reflecting cavity 442 that are not covered by the two light emitting diodes 106 reflect light and have reflectivity $R_C$. Illumination system 440 also includes two light collimating elements, a reflective light collimating element 446 and a refractive light collimating element 452. Reflective light collimating element 446 is a tapered light pipe. Light collimating element 446 has a light input surface 448, a light output surface 450 and reflecting sidewalls 449. Light reflections that occur at the sidewalls 449 may take place by total internal reflection or a reflective coating may cover the sidewalls 449. In order for collimation or partial collimation to occur, the area of the light output surface 450 must be larger than the area of the light input surface 448. Refractive light collimating element 452 is a convex lens. In order for the refractive light collimating element 452 to improve the light collimation, the area of the light collimating element 452 must be greater than the area of light pipe output surface 450. The light collimating elements preferably narrow the light output distribution to less than or equal to ±20 degrees, more preferably to less than or equal to ±10 degrees.

Another embodiment of the present invention is illumination system 500 shown in a cross-sectional side view in FIG. 13. The optical illuminations system in FIG. 13 is similar to the illumination system in FIG. 11 except that a partially-reflecting optical element 512 is placed in the optical path and covers the light output surface 510 of the compound parabolic reflector 506. The partially reflecting optical element 512 transmits a first portion of the light through the partially reflecting optical element 512 and a second portion of the light will be reflected back into the light-reflecting cavity 502. An example of partially reflecting optical element 512 is a reflective polarizer. A reflective polarizer is any polarizer that transmits one polarization state and reflects the other polarization state. Polarization states may be linear polarization states or circular polarization states. An example of a suitable reflective polarizer is a subwavelength optical polarizer made by NanoOpto Corporation Another embodiment of the present invention is illumination system 520 shown in a cross-sectional side view in FIG. 14. The optical illuminations system in FIG. 14 is similar to the illumination system in FIG. 11 except that a partially-reflecting optical element 532 is placed in the optical path and covers the light output surface 530 of the light collimating element 526. In FIG. 14, the partially-reflecting optical element 532 is a polarization cube prism which has a partially reflecting surface 534. The partially reflecting optical element 532 transmits a first polarization of the light through the partially reflecting surface 534 (shown by light ray 538) and reflects a second polarization of the light to a second full reflector 536 (shown by light ray 539). The second polarization of the light will be reflected back into the light-reflecting cavity 522 via the partially reflecting surface 534 and the compound parabolic reflector 526 (shown by light ray 540). In this example, the full reflector 536 may be coated onto the polarization cube prism.

Another embodiment of the present invention is illumination system 560 shown in a cross-sectional side view in FIG. 15. Illumination system 560 utilizes two optical illumination systems including two light-reflecting cavities (562 and 572) and two light collimating elements (566 and 576). The two optical illumination systems share one polarization cube prism 580. Light-reflecting cavity 562 and light-reflecting cavity 572 are shown, for simplicity, to each have two light emitting diodes 106. However, either cavity may have any number of light emitting diodes 106. Light-reflecting cavity 562 has inside surfaces 563 and a light output aperture 564. Light-reflecting cavity 572 has inside surfaces 573 and a light output aperture 574. The polarization cube prism 580 reflects light 591 of a first polarization stale coming from light collimating element 566 and light-reflecting cavity 562 into light collimating element 576 and light-reflecting cavity 572. The polarization cube prism 580 transmits light 592 of a second polarization state coming from light collimating element 566 and light-reflecting cavity 562. The transmitted light 592 is reflected by total specular reflector 586 and is transmitted through prism 590. The polarization cube prism 580 reflects light 593 of a first polarization state coming from light collimating element 576 and light-reflecting cavity 572 into light collimating element 566 and light-reflecting cavity 562. The polarization cube prism 580 transmits light 594 of a second polarization state coming from light collimating element 576 and light-reflecting cavity 572. The transmitted light 594 is reflected by total specular reflector 584 and is transmitted through prism 590. The resulting combined output luminance of a second polarization state exiting from prism 590 is greater than the output luminance of a second polarization state coming from a single optical illumination system.

The following specific examples are presented to illustrate the invention and should not be construed to place limitations on the invention.

EXAMPLE 1

In this example, a non-sequential, ray-tracing, computer program is used to calculate the relative output luminance and the overall output efficiency of a light-reflecting cavity containing twelve identical LED sources. Each LED source has dimensions of 2 mm×2 mm, an area of 4 mm$^2$, an emitted flux of 150 lumens and intrinsic luminance $L_I$. Each LED source is assumed to have a Lambertian output light distribution. The total area $A_S$ of the twelve LED sources is 48 mm$^2$, and the total emitted flux of the twelve LED sources is 1800 lumens. The light-reflecting cavity has a square cross-section with inside dimensions of 2.8 mm×2.8 mm, inside length of 9 mm and a total inside area of 70.56 mm$^2$. The total inside area includes the area of the twelve LED sources and the area of the output aperture. This example is illustrated schematically in FIG. 6. The light output aperture of the light-reflecting cavity has an area $A_O$ of 7.2 mm$^2$ so that $A_O/A_S$=0.15, i.e. the area of the light output aperture is 15% of the total area of the LED sources. For simplicity, the specular reflectivity $R_S$ of the LED sources is assumed to be identical in magnitude to the diffuse reflectivity $R_C$ of the inside surfaces of the light-reflecting cavity that are not covered by the sources. In the calculations, the reflectivity $R_S=R_C$ is varied, having values of 40%, 50%, 60%, 70%, 80%, 90%, or 98%. The results are shown below in TABLE 1. The ratio, $L_O/L_I$, of the output luminance $L_O$ to the intrinsic luminance $L_I$ of the LED sources gives the luminance (brightness) enhancement resulting from light recycling. The calculated efficiency is the percentage of light flux generated by the sources that passes through the output aperture. The remainder of the light flux is lost due to absorption by the sources and the cavity.

TABLE 1

| Area $A_O$ of output aperture (mm$^2$) | Total source area $A_S$ (mm$^2$) | Area ratio $A_O/A_S$ | Source $R_S$ (%) | Cavity $R_C$ (%) | Luminance enhancement ($L_O/L_I$) | Efficiency (%) | Total lumens out (lm) |
|---|---|---|---|---|---|---|---|
| 7.2 | 48 | 0.15 | 40 | 40 | 0.70 | 10.5 | 189 |
| 7.2 | 48 | 0.15 | 50 | 50 | 0.81 | 12.2 | 220 |
| 7.2 | 48 | 0.15 | 60 | 60 | 0.97 | 14.5 | 261 |
| 7.2 | 48 | 0.15 | 70 | 70 | 1.22 | 18.3 | 329 |
| 7.2 | 48 | 0.15 | 80 | 80 | 1.67 | 25.0 | 450 |
| 7.2 | 48 | 0.15 | 90 | 90 | 2.64 | 39.5 | 711 |
| 7.2 | 48 | 0.15 | 98 | 98 | 5.08 | 76.3 | 1373 |

The computer modeling results indicate that for $R_S=R_C$=60% or less, there is no luminance enhancement ($L_O/L_I$<1.00) and the efficiency is relatively low (<15%). As the reflectivity of the LED sources and the cavity increases, both the luminance enhancement and the efficiency increase. When $R_S=R_C$=98%, the luminance enhancement factor of $L_O/L_I$=5.08 due to light recycling is large and the efficiency of 76.3% is very high. A luminance enhancement factor of $L_O/L_I$=5.08 indicates that the output luminance of the illumination system is 5.08 times larger than the intrinsic luminance of the LED sources.

EXAMPLE 2

This EXAMPLE is similar to EXAMPLE 1 except that $A_O$ is reduced to 4.8 mm$^2$ and the ratio $A_O/A_S$ is thereby reduced to 0.10. In this example, a non-sequential, ray-tracing, computer program is used to calculate the relative output luminance and the overall output efficiency of a light-reflecting cavity containing twelve identical LED sources. For simplicity, the specular reflectivity $R_S$ of the LED sources is assumed to be identical in magnitude to the diffuse reflectivity $R_C$ of the inside surfaces of the light-reflecting cavity that are not covered by the LED sources. The results are shown below in TABLE 2.

The computer modeling results indicate that for $R_S=R_C=$ 50% or less, there is no luminance enhancement ($L_O/L_I \leq 1$) and the efficiency is relatively low ($\leq 5\%$). As the reflectivity of the LED sources and the cavity increases, both the luminance enhancement and the efficiency increase. When $R_S=R_C=98\%$, the luminance enhancement factor of 10.34 due to light recycling is vely large and the efficiency of 51.7% is high. The luminance enhancement is larger and the

TABLE 2

| Area $A_O$ of output aperture (mm²) | Total source area $A_S$ (mm²) | Area ratio $A_O/A_S$ | Source $R_S$ (%) | Cavity $R_C$ (%) | Luminance enhancement ($L_O/L_I$) | Efficiency (%) | Total lumens out (lm) |
|---|---|---|---|---|---|---|---|
| 4.8 | 48 | 0.10 | 40 | 40 | 0.79 | 7.9 | 142 |
| 4.8 | 48 | 0.10 | 50 | 50 | 0.91 | 9.2 | 166 |
| 4.8 | 48 | 0.10 | 60 | 60 | 1.08 | 10.8 | 194 |
| 4.8 | 48 | 0.10 | 70 | 70 | 1.38 | 13.8 | 248 |
| 4.8 | 48 | 0.10 | 80 | 80 | 1.89 | 19.2 | 346 |
| 4.8 | 48 | 0.10 | 90 | 90 | 3.11 | 31.1 | 560 |
| 4.8 | 48 | 0.10 | 98 | 98 | 6.87 | 68.7 | 1237 |

The computer modeling results indicate that for $R_S=R_C=$ 50% or less, there is no luminance enhancement ($L_O/L_I<1$) and the efficiency is low (<10%). As the reflectivity of the LED sources and the cavity increases, both the luminance enhancement and the efficiency increase. When $R_S=R_C=98\%$, the luminance enhancement factor of 6.87 due to light recycling is large and the efficiency of 68.7% is high. The luminance enhancement is larger and the efficiency is lower in this EXAMPLE compared to the respective quantities in EXAMPLE 1. Both results are due to reducing the size of the light output aperture from 15% to 10% of the total area of the LED sources.

EXAMPLE 3

This EXAMPLE is similar to EXAMPLE 1 and EXAMPLE 2 except that $A_O$ is reduced to 2.4 mm² and the ratio $A_O/A_S$ is reduced to 0.05. In this example, a non-sequential, ray-tracing, computer program is used to calculate the relative output luminance and the overall output efficiency of a light-reflecting cavity containing twelve identical LED sources. For simplicity, the specular reflectivity $R_S$ of the LED sources is assumed to be identical in magnitude to the diffuse reflectivity $R_C$ of the inside surfaces of the light-reflecting cavity that are not covered by the sources. The results are shown below in TABLE 3.

efficiency is lower in this EXAMPLE compared to the respective quantities in EXAMPLE 1 and EXAMPLE 2. Both results are due to reducing the size of the light output aperture to 5% of the total area of the LED sources.

EXAMPLE 4

This EXAMPLE is similar to EXAMPLE 2 except that $R_C$ is held constant at 98% and $R_S$ is varied from 5% to 98%. In this example, a non-sequential, ray-tracing, computer program is used to calculate the relative output luminance and the overall output efficiency of a light-reflecting cavity containing twelve identical LED sources. The light output aperture of the light-reflecting cavity has an area $A_O$ of 4.8 mm² so that $A_O/A_S=0.10$, i.e. the area of the light output aperture is 10% of the total area of the LED sources. The diffuse reflectivity $R_C$ of the light-reflecting cavity is assumed to be constant at 98%. The specular reflectivity $R_S$ is varied, having values of 5%, 10%, 20%, 30%, 40%, 50%, 60%, 70%, 80%, 90%, or 98%. The results are shown below in TABLE 4. The ratio, $L_O/L_I$, of the output luminance $L_O$ to the intrinsic luminance $L_I$ of the sources gives the luminance (brightness) enhancement resulting from light recycling.

TABLE 3

| Area $A_O$ of output aperture (mm²) | Total source area $A_S$ (mm²) | Area ratio $A_O/A_S$ | Source $R_S$ (%) | Cavity $R_C$ (%) | Luminance enhancement ($L_O/L_I$) | Efficiency (%) | Total lumens out (lm) |
|---|---|---|---|---|---|---|---|
| 2.4 | 48 | 0.05 | 40 | 40 | 0.87 | 4.4 | 79 |
| 2.4 | 48 | 0.05 | 50 | 50 | 1.00 | 5.0 | 90 |
| 2.4 | 48 | 0.05 | 60 | 60 | 1.19 | 5.9 | 106 |
| 2.4 | 48 | 0.05 | 70 | 70 | 1.49 | 7.5 | 135 |
| 2.4 | 48 | 0.05 | 80 | 80 | 2.12 | 10.6 | 191 |
| 2.4 | 48 | 0.05 | 90 | 90 | 3.66 | 18.3 | 329 |
| 2.4 | 48 | 0.05 | 98 | 98 | 10.34 | 51.7 | 931 |

TABLE 4

| Area $A_O$ of output aperture (mm$^2$) | Total source area $A_S$ (mm$^2$) | Area ratio $A_O/A_S$ | Source $R_S$ (%) | Cavity $R_C$ (%) | Luminance enhancement ($L_O/L_I$) | Efficiency (%) | Total lumens out (lm) |
|---|---|---|---|---|---|---|---|
| 4.8 | 48 | 0.10 | 5  | 98 | 0.93 | 9.3  | 167 |
| 4.8 | 48 | 0.10 | 10 | 98 | 0.97 | 9.7  | 175 |
| 4.8 | 48 | 0.10 | 20 | 98 | 1.08 | 10.8 | 194 |
| 4.8 | 48 | 0.10 | 30 | 98 | 1.24 | 12.4 | 223 |
| 4.8 | 48 | 0.10 | 40 | 98 | 1.39 | 13.9 | 250 |
| 4.8 | 48 | 0.10 | 50 | 98 | 1.62 | 16.2 | 292 |
| 4.8 | 48 | 0.10 | 60 | 98 | 1.92 | 19.2 | 346 |
| 4.8 | 48 | 0.10 | 70 | 98 | 2.37 | 23.7 | 427 |
| 4.8 | 48 | 0.10 | 80 | 98 | 3.11 | 31.1 | 560 |
| 4.8 | 48 | 0.10 | 90 | 98 | 4.48 | 44.8 | 806 |
| 4.8 | 48 | 0.10 | 98 | 98 | 6.87 | 68.7 | 1237 |

The computer modeling results indicate that for $R_S=10\%$ or less and $R_C=98\%$, there is no luminance enhancement ($L_O/L_I \leq 1$) and the efficiency is relatively low (<10%). Typical blackbody or gray body light sources have low reflectivity (<10%), and the results in this EXAMPLE indicate that such sources are not suitable for use in this invention. As the reflectivity of the sources increases, both the luminance enhancement and the efficiency increase. When $R_S=98\%$ and $R_C=98\%$, the luminance enhancement factor of $L_O/L_I=6.87$ indicates that the output luminance of the illumination system is 6.87 times larger than the intrinsic luminance of the LED sources.

EXAMPLE 5

This EXAMPLE is identical to EXAMPLE 4 except that the unpolarized light output of the illumination system in EXAMPLE 4 is passed through a LCD display. The LCD display is assumed to pass one polarization state with no optical losses and completely block the other polarization state. Other losses from the LCD due to the effective transmission area of each LCD pixel are not considered. In this example, the illumination system has no polarization recycling. A non-sequential, ray-tracing, computer program is used to calculate the relative output luminance and the overall output efficiency of a light-reflecting cavity containing twelve identical LED light sources. This example is illustrated schematically in FIG. 6, although the LCD display is not shown. The light output aperture of the light-reflecting cavity has an area $A_O$ of 4.8 mm$^2$ so that $A_O/A_S=0.10$, i.e. the area of the light output aperture is 10% of the total area of the sources. The diffuse reflectivity $R_C$ of the light-reflecting cavity is assumed to be constant at 98%. The specular reflectivity $R_S$ is varied, having values of 5%, 10%, 20%, 30%, 40%, 50%, 60%, 70%, 80%, 90%, or 98%. The luminance enhancement and efficiency are shown below in TABLE 5 for two cases: (1) the resulting values before the light has passed through the LCD display, and (2) the resulting values after the light has passed through the LCD display. The ratio, $L_O/L_I$, of the output luminance $L_O$ to the intrinsic luminance $L_I$ of the LED sources gives the luminance (brightness) enhancement resulting from light recycling. The calculated efficiency is the percentage of light flux generated by the sources that passes either through the light output aperture or through both the light output aperture and the LCD display. The remainder of the light flux is lost due to absorption by the sources and the cavity.

TABLE 5

| Area ratio $A_O/A_S$ | $R_S$ (%) | $R_C$ (%) | Luminance enhancement before LCD ($L_O/L_I$) | Efficiency before LCD (%) | Luminance enhancement after LCD ($L_O/L_I$) | Efficiency after LCD (%) | Total lumens out of LCD (lm) |
|---|---|---|---|---|---|---|---|
| 0.10 | 5  | 98 | 0.93 | 9.3  | 0.47 | 4.7  | 85  |
| 0.10 | 10 | 98 | 0.97 | 9.7  | 0.49 | 4.9  | 88  |
| 0.10 | 20 | 98 | 1.08 | 10.8 | 0.54 | 5.4  | 97  |
| 0.10 | 30 | 98 | 1.24 | 12.4 | 0.62 | 6.2  | 112 |
| 0.10 | 40 | 98 | 1.39 | 13.9 | 0.70 | 7.0  | 126 |
| 0.10 | 50 | 98 | 1.62 | 16.2 | 0.81 | 8.1  | 146 |
| 0.10 | 60 | 98 | 1.92 | 19.2 | 0.96 | 9.6  | 173 |
| 0.10 | 70 | 98 | 2.37 | 23.7 | 1.19 | 11.9 | 214 |
| 0.10 | 80 | 98 | 3.11 | 31.1 | 1.56 | 15.6 | 281 |
| 0.10 | 90 | 98 | 4.48 | 44.8 | 2.24 | 22.4 | 403 |
| 0.10 | 98 | 98 | 6.87 | 68.7 | 3.44 | 34.4 | 619 |

Since the LCD display blocks the 50% of the light that has the incorrect polarization, both the luminance enhancement and the efficiency are reduced by a factor of two after passing through the LCD display.

EXAMPLE 6

This EXAMPLE is identical to EXAMPLE 5 except that a reflective polarizer is placed over the output aperture of the illumination system. The reflective polarizer passes light having one polarization state (the polarization state that can pass through the LCD display unhindered) and reflects and recycles light of the other polarization state back into the light-reflecting cavity. The LCD display is assumed to pass the correctly polarized light with no optical losses due to polarization. Other losses from the LCD due to the effective transmission area of each LCD pixel are not considered. In this EXAMPLE, there is polarized light recycling at the light output aperture in addition to other light recycling within the light-reflecting cavity. A non-sequential, ray-tracing, computer program is used to calculate the relative output luminance and the overall output efficiency of a light-reflecting cavity containing twelve identical LED light sources. This example is illustrated schematically in FIG. 6, except that the reflective polarizer and the LCD display are not shown in FIG. 6. The light output aperture of the light-reflecting cavity has an area $A_O$ of 4.8 mm² so that $A_O/A_S$=0.10, i.e. the area of the light output aperture is 10% of the total area of the sources. The diffuse reflectivity $R_C$ of the light-reflecting cavity is assumed to be constant at 98%. The specular reflectivity $R_S$ of the LED light sources is varied, having values of 5%, 10%., 20%, 30%, 40%, 50%, 60%, 70%, 80%, 90%, or 98%. The luminance enhancement and efficiency are shown below in TABLE 6 for two cases: (1) the resulting values before the light has passed through the LCD display, and (2) the resulting values after the light has passed through the LCD display. The ratio, $L_O/L_I$, of the output luminance $L_O$ to the intrinsic luminance $L_I$ of the LED sources gives the luminance (brightness) enhancement resulting from light recycling. The calculated efficiency is the percentage of light flux generated by the sources that passes either through the light output aperture or through both the light output aperture and the LCD display. The remainder of the light flux is lost due to absorption by the sources and the cavity.

light-reflecting cavity has an area $A_O$ of 4.8 mm² so that $A_O/A_S$=0.10, i.e. the area of the light output aperture is 10% of the total area of the LED sources. The light output aperture is a rectangle with dimensions of 1.90 mm×2.53 mm. The ratio of the light output aperture dimensions is 1.90:2.53=3:4. From the ray-tracing calculations done in EXAMPLE 4, when the specular reflectivity $R_S$ of the LED sources is 90% and the diffuse reflectivity $R_C$ of the inside surfaces of the light-reflecting cavity is 98%, the light output from the light-output aperture is 806 lumens and the luminance enhancement is $L_O/L_I$=4.48. At the light-output aperture, the output light distribution is Lambertian (±90°). A tapered waveguide light-collimating element is placed at the light-output aperture of the light-reflecting capacity to partially collimate the light. The tapered waveguide has input dimensions of 1.90 mm×2.53 mm (ratio 3:4) and output dimensions of 15 mm×30 mm (ratio 3:4). The input area of the tapered waveguide is 4.8 mm² and the output area is 300 mm², an increase by a factor of 62.5. Using the entendue relationship, the solid angle of the light output distribution from the tapered waveguide will be a factor of 62.5 smaller than the light input distribution. Since the solid angle of the Lambertian input distribution is 2π=6.28, the solid angle of the light output distribution is 0.10 or approximately ±10°.

What is claimed is:

1. An optical illumination system comprising:
   a) A light source for generating light, wherein said light source is at least one light emitting diode having a reflecting surface with reflectivity $R_S$ greater than or equal to 50 percent, wherein the maximum intrinsic luminance of said light source is $L_I$ and wherein the total light emitting area of said light source is area $A_S$;
   b) A light-reflecting cavity enclosing said light source, wherein the inside surfaces of said light-reflecting cavity have reflectivity $R_C$ greater than or equal to 50 percent, aid wherein the inside surfaces of said light-reflecting cavity can reflect and recycle a portion of the light generated by said light source back to said light source; and
   c) At least one light output aperture in a surface of said light-reflecting cavity, wherein the area of said light output aperture is area $A_O$ and wherein said area $A_O$ is less than said area $A_S$.

2. An optical illumination system of claim 1, wherein the light output from said light output aperture has luminance $L_O$ that is greater than $L_I$.

3. An optical illumination system of claim 1, wherein said light source is a plurality of light emitting diodes.

TABLE 6

| Area ratio $A_O/A_S$ | $R_S$ (%) | $R_C$ (%) | Luminance enhancement before LCD ($L_O/L_I$) | Efficiency before LCD (%) | Luminance enhancement after LCD ($L_O/L_I$) | Efficiency after LCD (%) | Total lumens out of LCD (lm) |
|---|---|---|---|---|---|---|---|
| 0.10 | 5 | 98 | 0.48 | 4.8 | 0.48 | 4.8 | 86 |
| 0.10 | 10 | 98 | 0.51 | 5.1 | 0.51 | 5.1 | 92 |
| 0.10 | 20 | 98 | 0.57 | 5.7 | 0.57 | 5.7 | 103 |
| 0.10 | 30 | 98 | 0.66 | 6.6 | 0.66 | 6.6 | 119 |
| 0.10 | 40 | 98 | 0.74 | 7.4 | 0.74 | 7.4 | 133 |
| 0.10 | 50 | 98 | 0.87 | 8.7 | 0.87 | 8.7 | 157 |
| 0.10 | 60 | 98 | 1.06 | 10.6 | 1.06 | 10.6 | 191 |
| 0.10 | 70 | 98 | 1.33 | 13.3 | 1.33 | 13.3 | 239 |
| 0.10 | 80 | 98 | 1.82 | 18.2 | 1.82 | 18.2 | 328 |
| 0.10 | 90 | 98 | 2.86 | 28.6 | 2.86 | 28.6 | 515 |
| 0.10 | 98 | 98 | 5.19 | 51.9 | 5.19 | 51.9 | 934 |

Since the polarized output of the illumination system has the proper polarization to pass through the LCD display, no light is lost due to polarization effects. Both the luminance enhancement and the efficiency are higher in this EXAMPLE where there is polarization recycling than in EXAMPLE 5 where there was no polarization recycling.

EXAMPLE 7

In this example, a light-reflecting cavity containing twelve identical LED sources is combined with a tapered waveguide light-collimating element. Each LED source has dimensions of 2 mm×2 mm, an area of 4 mm², an emitted flux of 150 lumens and intrinsic luminance $L_I$. Each LED source is assumed to have a Lambertian output light distribution. The total area $A_S$ of the twelve LED sources is 48 mm² and the total emitted flux of the twelve LED sources is 1800 lumens. The light-reflecting cavity has a square cross-section with inside dimensions of 2.8 mm×2.8 mm and inside length of 9 mm. The light output aperture of the 4. An optical illumination system of claim 3, wherein said light source is a plurality of green and blue light emitting diodes.

5. An optical illumination system of claim 3, wherein said light source is a plurality of red, green and blue light emitting diodes.

6. An optical illumination system of claim 5, wherein said plurality of red, green and blue light emitting diodes are illuminated in a color sequential fashion.

7. An optical illumination system of claim 1, wherein said light-reflecting cavity is hollow.

8. An optical illumination system of claim 1, wherein said light-reflecting cavity is filled or partially filled with a transparent material.

9. An optical illumination system of claim 8, wherein said transparent material is a glass.

10. An optical illumination system of claim 8, wherein said transparent material is a plastic.

11. An optical illumination system of claim 8, wherein said transparent material is a liquid.

12. An optical illumination system of claim 1, wherein said reflectivity $R_S$ is at least 75%.

13. An optical illumination system of claim 1, wherein said reflectivity $R_S$ is at least 90%.

14. An optical illumination system of claim 1, wherein said reflectivity $R_C$ is at least 75%.

15. An optical illumination system of claim 1, wherein said reflectivity $R_C$ is at least 90%.

16. An optical illumination system of claim 1, wherein said surface of said light-reflecting cavity contains a plurality of said light output apertures with total output aperture area of $A_O$.

17. An optical illumination system of claim 1, wherein said area $A_O$ is less than or equal to 50% of said area $A_S$.

18. An optical illumination system of claim 1, wherein said area $A_O$ is less than or equal to 25% of said area $A_S$.

19. An optical illumination system of claim 1, wherein said area $A_O$ is less than or equal to 10% of said area $A_S$.

20. An optical illumination system of claim 1, wherein said area $A_O$ is less than 25 square millimeters.

21. An optical illumination system of claim 1, wherein said area $A_O$ is less than 10 square millimeters.

22. An optical illumination system of claim 1, wherein said light-reflecting cavity has a polygonal cross-section.

23. An optical illumination system of claim 22, wherein said polygonal cross-section is a square.

24. An optical illumination system of claim 1, wherein said light-reflecting cavity has an elliptical cross-section.

25. An optical illumination system of claim 24, wherein said elliptical cross-section is a circle.

26. An optical illumination system of claim 1, wherein said light-reflecting cavity has a uniform cross-section along an axis of said light-reflecting cavity that passes through the center of said light output aperture and that is perpendicular to the plane of said light output aperture.

27. An optical illumination system of claim 1, wherein said light-reflecting cavity has a tapered cross-section along an axis of said light-reflecting cavity that passes through the center of said light output aperture and that is perpendicular to the plane of said light output aperture.

28. An optical illumination system comprising:
a) A light source for generating light, wherein said light source is at least one light emitting diode having a reflecting surface with reflectivity $R_S$ greater than or equal to 50 percent, wherein the maximum intrinsic luminance of said light source is $L_I$ and wherein the total light emitting area of said light source is area $A_S$;

b) A light-reflecting cavity enclosing said light source, wherein the inside surfaces of said light-reflecting cavity have reflectivity $R_C$ greater than or equal to 50 percent, and wherein the inside surfaces of said light-reflecting cavity can reflect and recycle a portion of the light generated by said light source back to said light source;

c) At least one light output aperture in a surface of said light-reflecting cavity, wherein the area of said light output aperture is area $A_O$ and wherein said area $A_O$ is less than said area $A_S$; and d) At least one partially reflecting optical element located in the light output optical path and located adjacent to said light output aperture of said light-reflecting cavity, wherein said partially reflecting optical element passes a first portion of the light transmitted by said light output aperture and reflects and recycles a second portion of the light transmitted by said light output aperture back into said light-reflecting cavity.

29. An optical illumination system of claim 28, wherein the light output from said light output aperture has luminance $L_O$ that is greater than $L_I$.

30. An optical illumination system of claim 28, wherein said light source is a plurality of light emitting diodes.

31. An optical illumination system of claim 28, wherein said partially reflecting optical element is a reflective polarizer.

32. An optical illumination system of claim 28, wherein said partially reflecting optical element is a variable aperture with a reflective coating.

33. An optical illumination system comprising:
a) A light source for generating light, wherein said light source is at least one light emitting diode having a reflecting surface with reflectivity $R_S$ greater than or equal to 50 percent, wherein the maximum intrinsic luminance of said light source is $L_I$ and wherein the total light emitting area of said light source is area $A_S$;

b) A light-reflecting cavity enclosing said light source, wherein the inside surfaces of said light-reflecting cavity have reflectivity $R_C$ greater than or equal to 50 percent, and wherein the inside surfaces of said light-reflecting cavity can reflect and recycle a portion of the light generated by said light source back to said light source;

c) At least one light output aperture in a surface of said light-reflecting cavity, wherein the area of said light output aperture is area $A_O$ and wherein said area $A_O$ is less than said area $A_S$; and d) At least one light collimating element located in the light output optical path and located adjacent to said light output aperture of the said light-reflecting cavity, wherein said light collimating element partially collimates the light passing through said light output aperture.

34. An optical illumination system of claim 33, wherein the light output from said light output aperture has luminance $L_O$ that is greater than $L_I$.

35. An optical illumination system of claim 33, wherein said light collimating element is a refracting element.

36. An optical illumination system of claim 35, wherein said refracting element is a convex lens.

37. An optical illumination system of claim 33, wherein said light collimating element is a reflective element.

38. An optical illumination system of claim 37, wherein said reflective element is a compound parabolic reflector.

39. An optical illumination system of claim 33, wherein said optical illumination system includes a plurality of said light collimating elements.

40. An optical illumination system of claim 39, wherein said plurality of said light collimating elements includes a refractive element and a reflective element.

41. An optical illumination system comprising:
 a) A light source for generating light, wherein said light source is at least one light emitting diode having a reflecting surface with reflectivity $R_S$ greater than or equal to 50 percent, wherein the maximum intrinsic luminance of said light source is $L_I$ and wherein the total light emitting area of said light source is area $A_S$;
 b) A light-reflecting cavity enclosing said light source, wherein the inside surfaces of said light-reflecting cavity have reflectivity $R_C$ greater than or equal to 50 percent, and wherein the inside surfaces of said light-reflecting cavity can reflect and recycle a portion of the light generated by said light source back to said light source;
 c) At least one light output aperture in a surface of said light-reflecting cavity, wherein the area of said light output aperture is area $A_O$ and wherein said area $A_O$ is less than said area $A_S$;
 d) At least one light collimating element located in the light output optical path and located adjacent to said light output aperture of the said light-reflecting cavity, wherein said light collimating element partially collimates the light passing through said light output aperture; and
 e) At least one partially reflecting optical element located in the light output optical path and located adjacent to said light collimating element, wherein said partially reflecting optical element passes a first portion of the light transmitted by said light output aperture and reflects and recycles a second portion of the light transmitted by said light output aperture back into said light-reflecting cavity.

42. An optical illumination system of claim 41, wherein the light output from said light output aperture has luminance $L_O$ that is greater than $L_I$.

43. An optical illumination system of claim 41, wherein said partially reflecting optical element is a reflective polarizer.

44. A first optical illumination system comprising:
 a) A light source for generating light, wherein said light source is at least one light emitting diode having a reflecting surface with reflectivity $R_S$ greater than or equal to 50 percent, wherein the maximum intrinsic luminance of said light source is $L_I$ and wherein the total light emitting area of said light source is area $A_S$;
 b) A light-reflecting cavity enclosing said light source, wherein the inside surfaces of said light-reflecting cavity have reflectivity $R_C$ greater than or equal to 50 percent, and wherein the inside surfaces of said light-reflecting cavity can reflect and recycle a portion of the light generated by said light source back to said light source;
 c) A light output aperture in a surface of said light-reflecting cavity, wherein the area of said light output aperture is area $A_O$ and wherein said area $A_O$ is less than said area $A_S$;
 d) At least one light collimating element located in the light output optical path and located adjacent to said light output aperture of the said light-reflecting cavity, wherein said light collimating element partially collimates the light passing through said light output aperture; and
 e) At least one partially reflecting optical element located in the light output optical path and located adjacent to said light collimating element, wherein said partially reflecting optical element passes a first portion of the light transmitted by said light output aperture and reflects and recycles a second portion of the light transmitted by said light output aperture into a second optical illumination system.

45. An optical illumination system of claim 44, wherein the light output from said light output aperture has luminance $L_O$ that is greater than $L_I$.

46. An optical illumination system of claim 44, wherein said partially reflecting optical element is a reflective polarizer.

* * * * *